US012587914B2

(12) United States Patent (10) Patent No.: US 12,587,914 B2
Conceicao et al. (45) Date of Patent: Mar. 24, 2026

(54) ENHANCEMENT OF CONDITIONAL RECONFIGURATION PROCEDURES

(71) Applicant: InterDigital Patent Holdings, Inc., Wilmington, DE (US)

(72) Inventors: Filipe Conceicao, London (GB); Alain Mourad, Ascot (GB); James Miller, Northport, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 329 days.

(21) Appl. No.: 18/289,210

(22) PCT Filed: May 5, 2022

(86) PCT No.: PCT/US2022/027828
§ 371 (c)(1),
(2) Date: Nov. 1, 2023

(87) PCT Pub. No.: WO2022/235902
PCT Pub. Date: Nov. 10, 2022

(65) Prior Publication Data
US 2024/0259890 A1     Aug. 1, 2024

Related U.S. Application Data

(60) Provisional application No. 63/184,456, filed on May 5, 2021.

(51) Int. Cl.
*H04W 36/00* (2009.01)
*H04W 36/30* (2009.01)
(52) U.S. Cl.
CPC . *H04W 36/0058* (2018.08); *H04W 36/00833* (2023.05); *H04W 36/0088* (2013.01); *H04W 36/305* (2018.08)

(58) Field of Classification Search
CPC ....... H04W 36/0058; H04W 36/00833; H04W 36/0088; H04W 36/0094; H04W 36/305
See application file for complete search history.

(56) References Cited

U.S. PATENT DOCUMENTS

2021/0099942 A1 * 4/2021 Tripathi ............ H04W 36/0083
2022/0295359 A1 * 9/2022 Höhne ............ H04W 36/00837

FOREIGN PATENT DOCUMENTS

CN 116803134 A * 9/2023 ...... H04W 36/00837

OTHER PUBLICATIONS

Translation of CN-116803134-A (Year: 2023).*
(Continued)

*Primary Examiner* — Kashif Siddiqui
(74) *Attorney, Agent, or Firm* — Jamie T. Nguyen

(57) ABSTRACT
Procedures, methods, architectures, apparatuses, systems, devices, and computer program products are disclosed that may be implemented in a wireless transmit/receive unit (WTRU) for enhancing conditional reconfiguration procedures. In one representative embodiment, the WTRU may receive information associated with a conditional reconfiguration, and the information may respectively indicate a measurement resolution and/or a measurement period for at least one measurement report quantity associated with a conditional reconfiguration. After receiving the information, the WTRU may perform, over the measurement period, measurements on the at least one measurement report quantity according the measurement resolution. On condition the conditional reconfiguration is triggered, the WTRU may perform a random access procedure. After the random access procedure, the WTRU may send a measurement report for the random access procedure to a base station. The measurement report may include the measurements on the at least one measurement report.

18 Claims, 17 Drawing Sheets

(56) References Cited

OTHER PUBLICATIONS

"Summary of AI 8.13.2", 3GPP Tdoc R2-2102265, 3GPP TSG-RAN WG2 #113-e, Electronic meeting, Jan. 25-Feb. 5, 2021, 54 pages.

"Indication of candidate target cell", 3GPP Tdoc R2-2102145, 3GPP TSG-RAN WG2 #113-e, Electronic meeting, Jan. 25-Feb. 5, 2021, 6 pages.

Third Generation Partnership Project, Technical Specification Group Radio Access Network; NR; Radio Resource Control (RRC) protocol specification (Release 16), 3GPP TS 38.331 V16.3.1, Jan. 2021.

Third Generation Partnership Project, Technical Specification Group Radio Access Network; NR; NR and NG-RAN Overall Description; Stage 2 (Release 16), 3GPP TS 38.300 V16.5.0, Mar. 2021.

"Measurement report enhancement in conditional handover", 3GPP Tdoc R2-1903791, 3GPP TSG-RAN WG2 Meeting #105bis, Xi'an, China, Apr. 8-12, 2019, 2 pages.

* cited by examiner

Timeline of WTRU Actions for a Conditional Reconfiguration

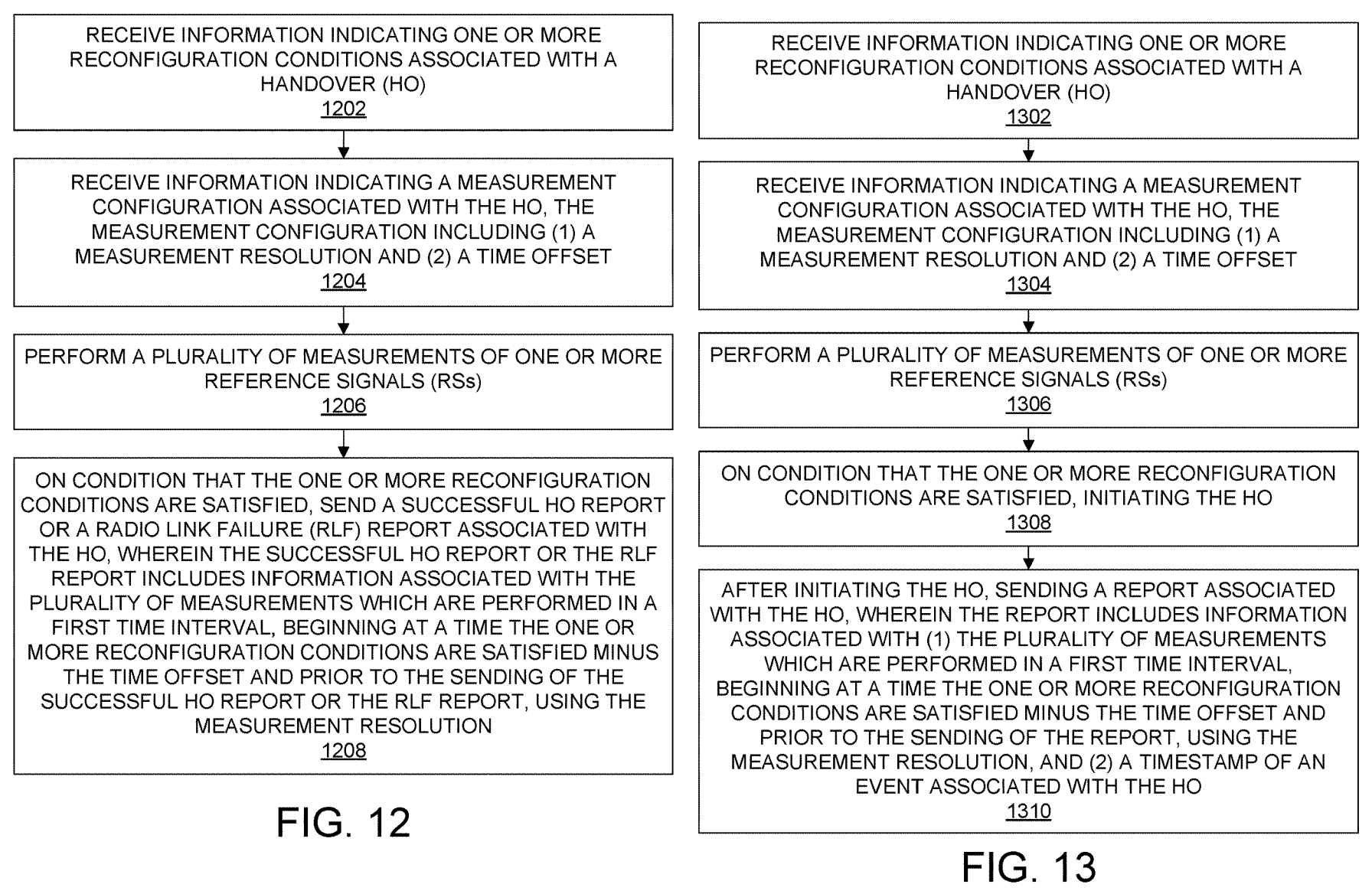

RECEIVE INFORMATION INDICATING ONE OR MORE RECONFIGURATION CONDITIONS ASSOCIATED WITH A HANDOVER (HO)
1302

RECEIVE INFORMATION INDICATING A MEASUREMENT CONFIGURATION ASSOCIATED WITH THE HO, THE MEASUREMENT CONFIGURATION INCLUDING (1) A MEASUREMENT RESOLUTION AND (2) A TIME OFFSET
1304

PERFORM A PLURALITY OF MEASUREMENTS OF ONE OR MORE REFERENCE SIGNALS (RSs)
1306

ON CONDITION THAT THE ONE OR MORE RECONFIGURATION CONDITIONS ARE SATISFIED, INITIATING THE HO
1308

AFTER INITIATING THE HO, SENDING A REPORT ASSOCIATED WITH THE HO, WHEREIN THE REPORT INCLUDES INFORMATION ASSOCIATED WITH (1) THE PLURALITY OF MEASUREMENTS WHICH ARE PERFORMED IN A FIRST TIME INTERVAL, BEGINNING AT A TIME THE ONE OR MORE RECONFIGURATION CONDITIONS ARE SATISFIED MINUS THE TIME OFFSET AND PRIOR TO THE SENDING OF THE REPORT, USING THE MEASUREMENT RESOLUTION, AND (2) A TIMESTAMP OF AN EVENT ASSOCIATED WITH THE HO
1310

FIG. 13

RECEIVE INFORMATION INDICATING ONE OR MORE RECONFIGURATION CONDITIONS ASSOCIATED WITH A HANDOVER (HO)
1202

RECEIVE INFORMATION INDICATING A MEASUREMENT CONFIGURATION ASSOCIATED WITH THE HO, THE MEASUREMENT CONFIGURATION INCLUDING (1) A MEASUREMENT RESOLUTION AND (2) A TIME OFFSET
1204

PERFORM A PLURALITY OF MEASUREMENTS OF ONE OR MORE REFERENCE SIGNALS (RSs)
1206

ON CONDITION THAT THE ONE OR MORE RECONFIGURATION CONDITIONS ARE SATISFIED, SEND A SUCCESSFUL HO REPORT OR A RADIO LINK FAILURE (RLF) REPORT ASSOCIATED WITH THE HO, WHEREIN THE SUCCESSFUL HO REPORT OR THE RLF REPORT INCLUDES INFORMATION ASSOCIATED WITH THE PLURALITY OF MEASUREMENTS WHICH ARE PERFORMED IN A FIRST TIME INTERVAL, BEGINNING AT A TIME THE ONE OR MORE RECONFIGURATION CONDITIONS ARE SATISFIED MINUS THE TIME OFFSET AND PRIOR TO THE SENDING OF THE SUCCESSFUL HO REPORT OR THE RLF REPORT, USING THE MEASUREMENT RESOLUTION
1208

FIG. 12

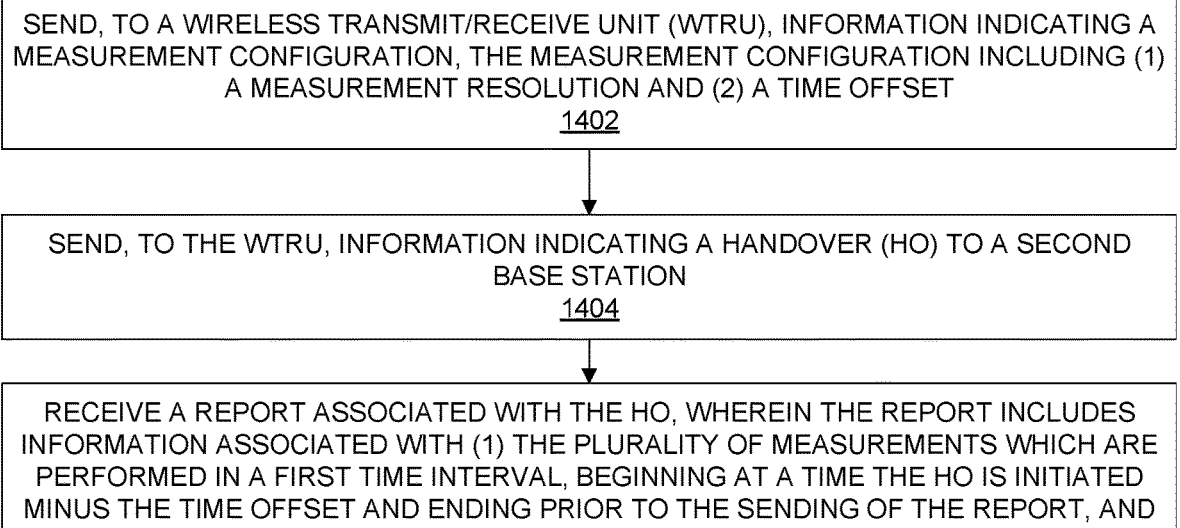

SEND, TO A WIRELESS TRANSMIT/RECEIVE UNIT (WTRU), INFORMATION INDICATING A MEASUREMENT CONFIGURATION, THE MEASUREMENT CONFIGURATION INCLUDING (1) A MEASUREMENT RESOLUTION AND (2) A TIME OFFSET
1402

SEND, TO THE WTRU, INFORMATION INDICATING A HANDOVER (HO) TO A SECOND BASE STATION
1404

RECEIVE A REPORT ASSOCIATED WITH THE HO, WHEREIN THE REPORT INCLUDES INFORMATION ASSOCIATED WITH (1) THE PLURALITY OF MEASUREMENTS WHICH ARE PERFORMED IN A FIRST TIME INTERVAL, BEGINNING AT A TIME THE HO IS INITIATED MINUS THE TIME OFFSET AND ENDING PRIOR TO THE SENDING OF THE REPORT, AND (2) A TIMESTAMP OF AN EVENT ASSOCIATED WITH THE HO
1406

FIG. 14

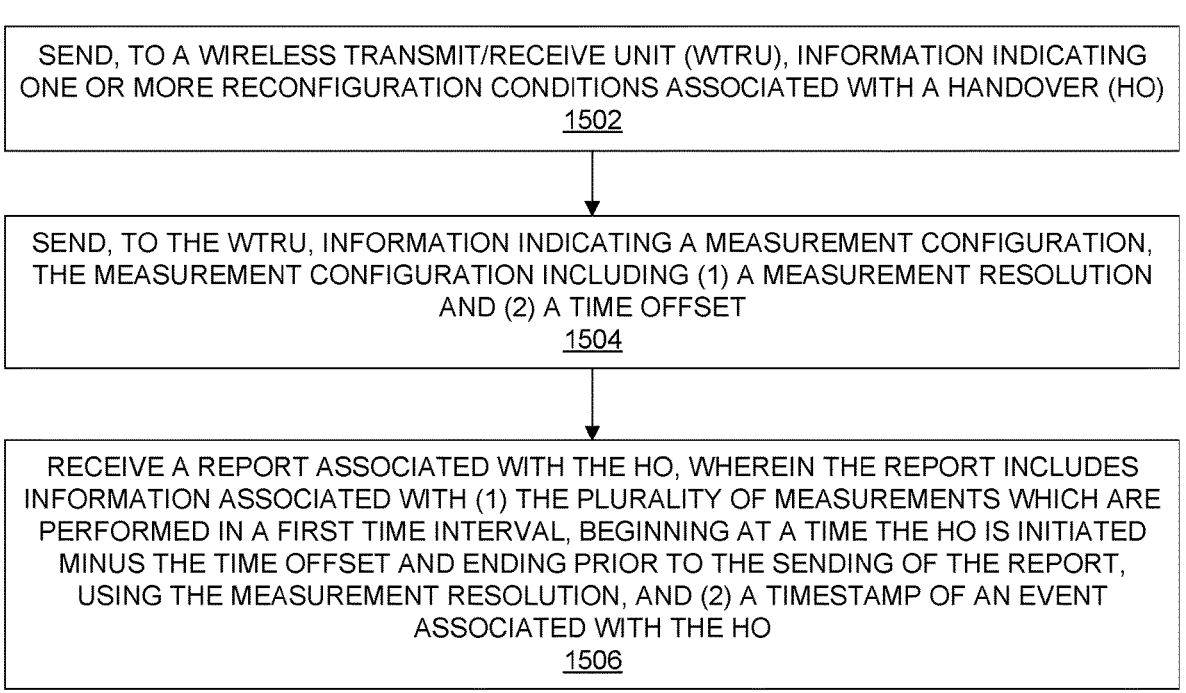

SEND, TO A WIRELESS TRANSMIT/RECEIVE UNIT (WTRU), INFORMATION INDICATING ONE OR MORE RECONFIGURATION CONDITIONS ASSOCIATED WITH A HANDOVER (HO)
1502

SEND, TO THE WTRU, INFORMATION INDICATING A MEASUREMENT CONFIGURATION, THE MEASUREMENT CONFIGURATION INCLUDING (1) A MEASUREMENT RESOLUTION AND (2) A TIME OFFSET
1504

RECEIVE A REPORT ASSOCIATED WITH THE HO, WHEREIN THE REPORT INCLUDES INFORMATION ASSOCIATED WITH (1) THE PLURALITY OF MEASUREMENTS WHICH ARE PERFORMED IN A FIRST TIME INTERVAL, BEGINNING AT A TIME THE HO IS INITIATED MINUS THE TIME OFFSET AND ENDING PRIOR TO THE SENDING OF THE REPORT, USING THE MEASUREMENT RESOLUTION, AND (2) A TIMESTAMP OF AN EVENT ASSOCIATED WITH THE HO
1506

FIG. 15

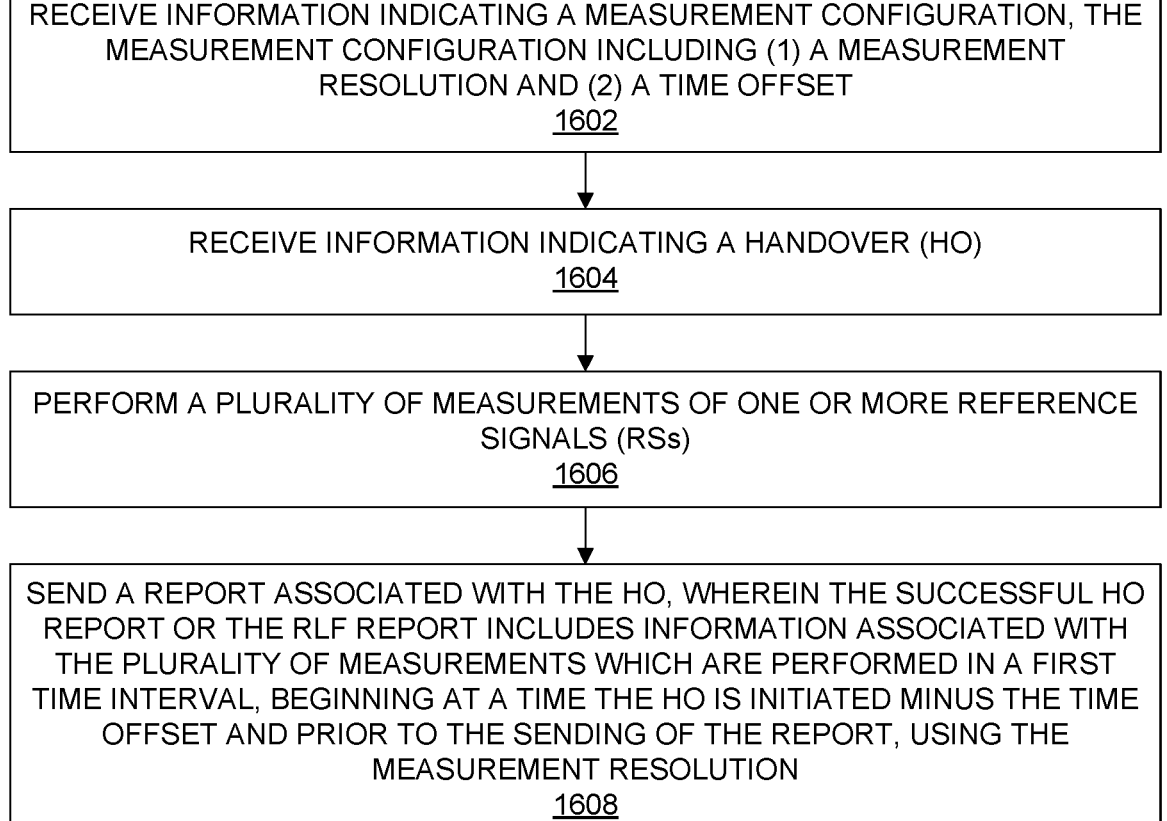

RECEIVE INFORMATION INDICATING A MEASUREMENT CONFIGURATION, THE
MEASUREMENT CONFIGURATION INCLUDING (1) A MEASUREMENT
RESOLUTION AND (2) A TIME OFFSET
1602

RECEIVE INFORMATION INDICATING A HANDOVER (HO)
1604

PERFORM A PLURALITY OF MEASUREMENTS OF ONE OR MORE REFERENCE
SIGNALS (RSs)
1606

SEND A REPORT ASSOCIATED WITH THE HO, WHEREIN THE SUCCESSFUL HO
REPORT OR THE RLF REPORT INCLUDES INFORMATION ASSOCIATED WITH
THE PLURALITY OF MEASUREMENTS WHICH ARE PERFORMED IN A FIRST
TIME INTERVAL, BEGINNING AT A TIME THE HO IS INITIATED MINUS THE TIME
OFFSET AND PRIOR TO THE SENDING OF THE REPORT, USING THE
MEASUREMENT RESOLUTION
1608

FIG. 16

ENHANCEMENT OF CONDITIONAL RECONFIGURATION PROCEDURES

CROSS-REFERENCE TO RELATED APPLICATIONS

This application is a U.S. National Stage Application under 35 U.S.C. § 371 of International Patent Application No. PCT/US2022/027828, filed 5, May, 2022, which claims the benefit of U.S. Provisional Patent Application No. (i) 63/184456 filed 5, May, 2021 which is incorporated herein by reference.

BACKGROUND

The present disclosure is generally directed to the fields of communications, software and encoding, including, for example, to methods, architectures, apparatuses, systems directed to handoff (HO) procedures, such as conditional handoff (CHO) procedures.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures (FIGs.) and the detailed description are not to be considered limiting, and other equally effective examples are possible and likely. Furthermore, like reference numerals ("ref.") in the FIGs. indicate like elements, and wherein:

FIG. 12 is a flow diagram illustrating a representative procedure for enhanced HO measurement reporting by a WTRU;

FIG. 13 is a flow diagram illustrating another representative procedure for enhanced conditional HO measurement reporting by a WTRU;

FIG. 14 is a flow diagram illustrating a representative procedure for receiving enhanced HO measurement reporting by a base station;

FIG. 15 is a flow diagram illustrating another representative procedure for receiving enhanced HO measurement reporting by a base station; and FIG. 16 is a flow diagram illustrating a representative procedure for enhanced HO measurement reporting by a WTRU.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications System

The methods, apparatuses and systems provided herein are well-suited for communications involving both wired and wireless networks. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
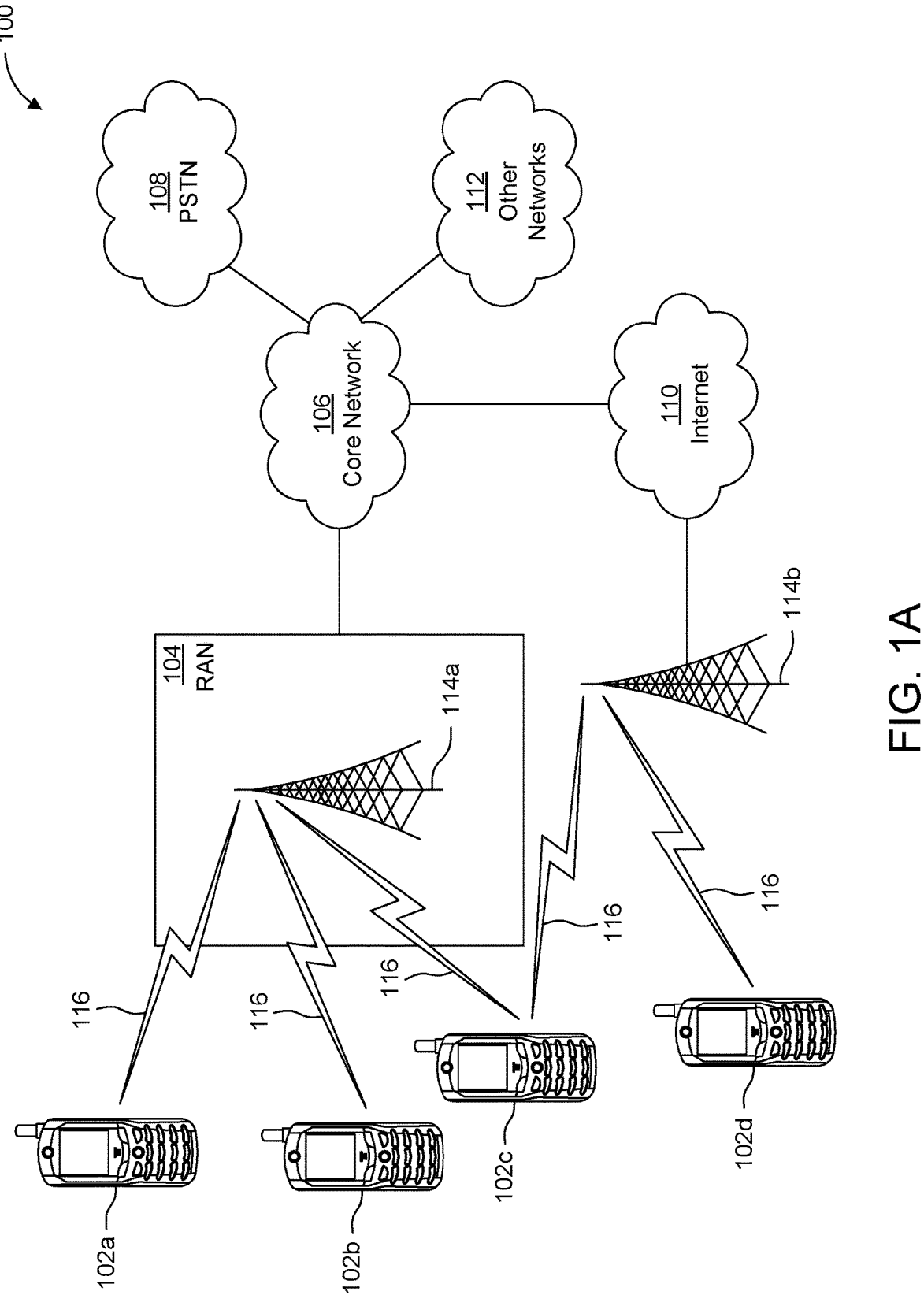
FIG. 1A is a system diagram illustrating an example communications system.

FIG. 1A is a system diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (IMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d, e.g., to facilitate access to one or more communication networks, such as the CN 106/115, the Internet 110, and/or the networks 112. By way of example, the base stations 114a, 114b may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in an embodiment, the base station 114a may include three transceivers, i.e., one for each sector of the cell. In an embodiment, the base station 114a may employ multiple-input multiple output (MIMO) technology and may utilize multiple transceivers for each or any sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In an embodiment, the base station 114a and the WTRUs 102a, 102b, 102c may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In an embodiment, the base station 114*b* and the WTRUs 102*c*, 102*d* may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/114 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
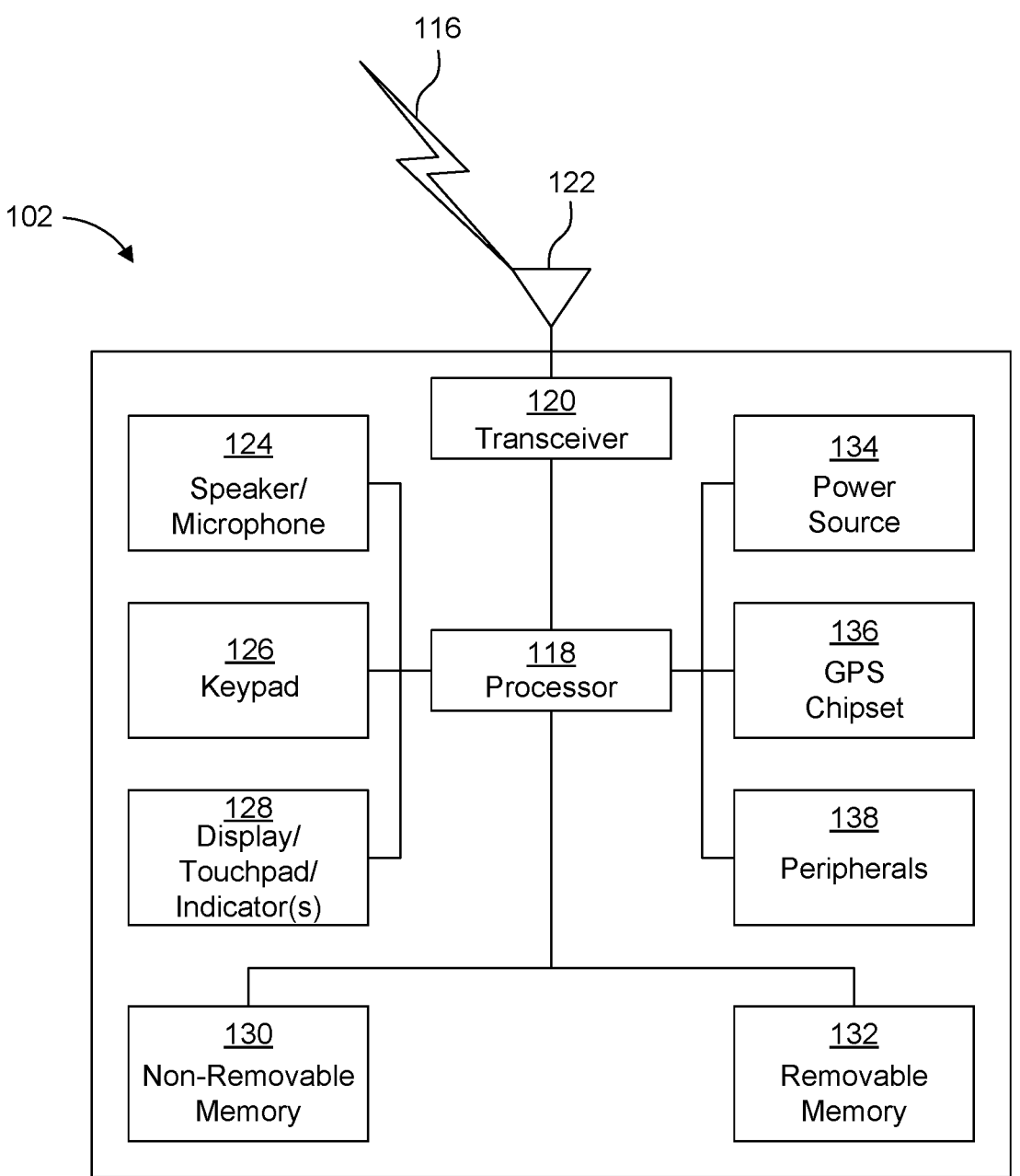
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other elements/peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114*a*) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. For example, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other elements/peripherals 138, which may include one or more software and/or hardware modules/units that provide additional features, functionality and/or wired or wireless connectivity. For example, the elements/peripherals 138 may include an accelerometer, an e-compass, a satellite transceiver, a digital camera (e.g., for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The elements/peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the uplink (e.g., for transmission) or the downlink (e.g., for reception)).

Figure 1C:
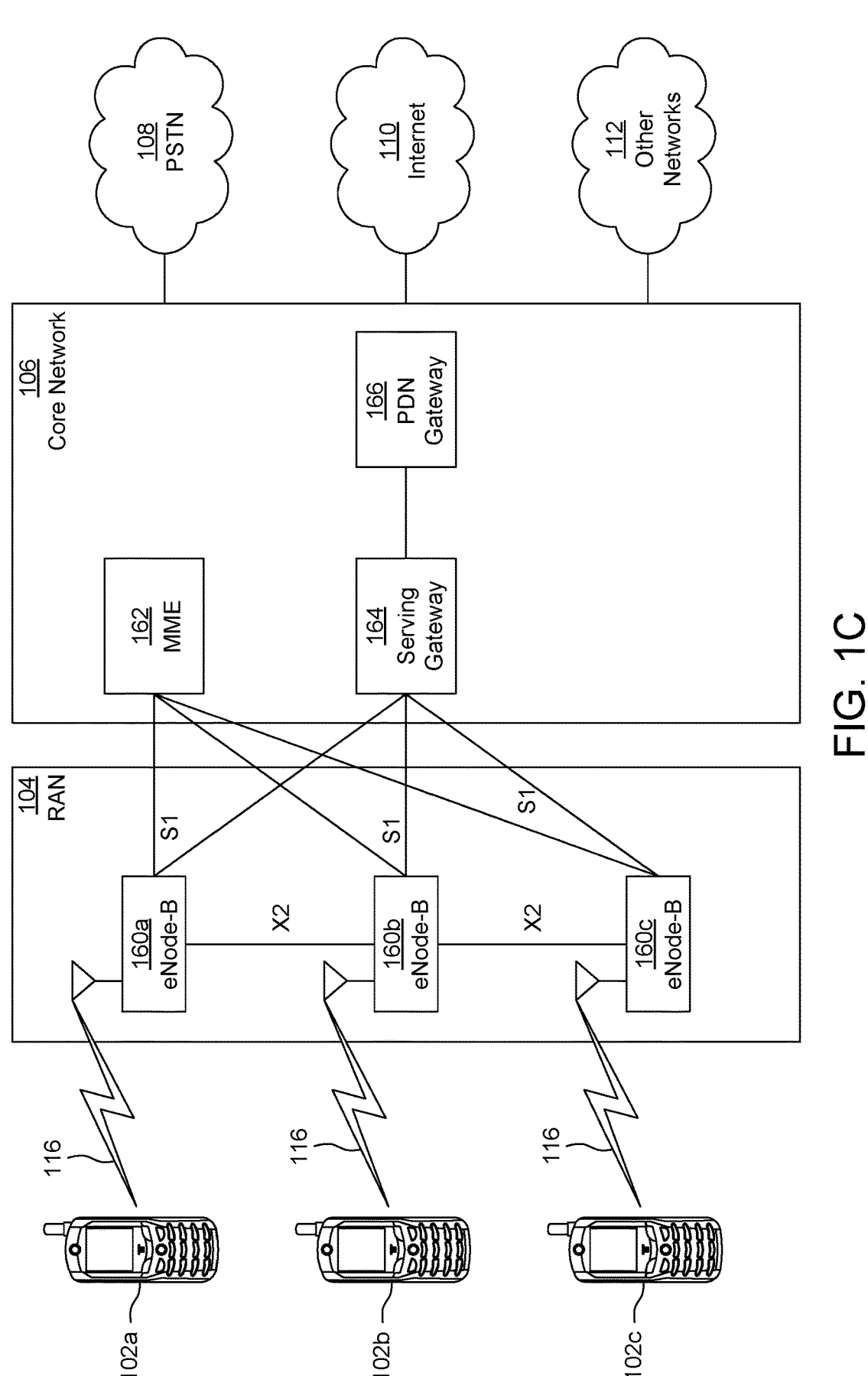
FIG. 1C is a system diagram illustrating an example radio access network (RAN) and an example core network (CN) that may be used within the communications system illustrated in FIG. 1A.

FIG. 1C is a system diagram illustrating the RAN 104 and the CN 106 according to an embodiment. As noted above, the RAN 104 may employ an E-UTRA radio technology to communicate with the WTRUs 102a, 102b, and 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink (UL) and/or downlink (DL), and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While each of the foregoing elements are depicted as part of the CN 106, it will be appreciated that any one of these elements may be owned and/or operated by an entity other than the CN operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode-Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode-B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in infrastructure basic service set (BSS) mode may have an access point (AP) for the BSS and one or more stations (STAs) associated with the AP. The AP may have an access or an interface to a distribution system (DS) or another type of wired/wireless network that carries traffic into and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier sense multiple access with collision avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High throughput (HT) STAs may use a 40 MHz wide channel for communication, for example, via a combination of the primary 20 MHz channel with an adjacent or nonadjacent 20 MHz channel to form a 40 MHz wide channel.

Very high throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse fast fourier transform (IFFT) processing, and time domain processing, may be done on each stream separately. The streams may be mapped on to the two 80 MHz channels, and the data may be transmitted by a transmitting STA. At the receiver of the receiving STA, the above-described operation for the 80+80 configuration may be reversed, and the combined data may be sent to a medium access control (MAC) layer, entity, etc.

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV white space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support meter type control/machine-type communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or network allocation vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
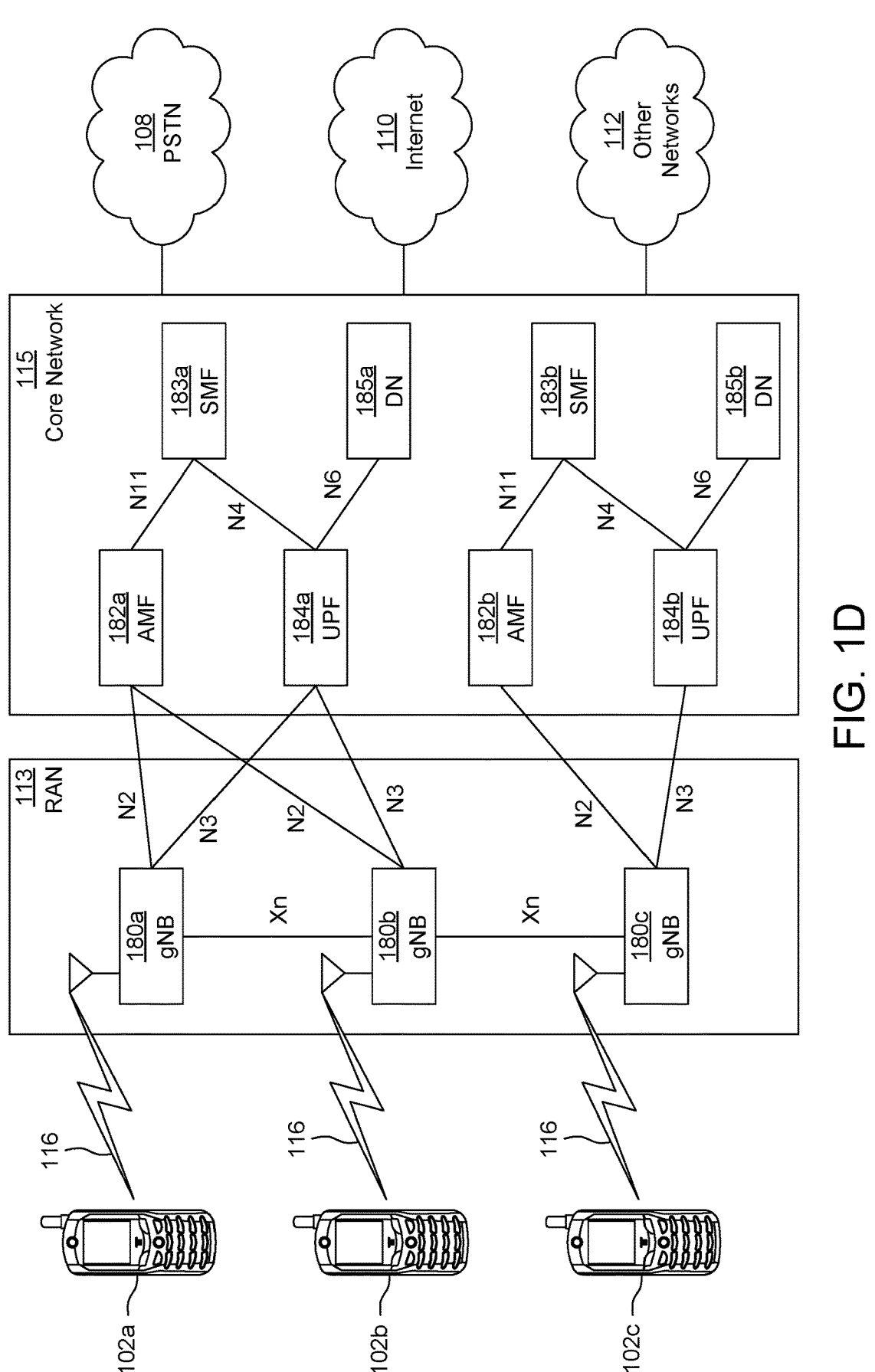
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In an embodiment, the gNBs 180a, 180b, 180c may implement MIMO technology. For example, gNBs 180a, 180b may utilize beamforming to transmit signals to and/or receive signals from the WTRUs 102a, 102b, 102c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., including a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards user plane functions (UPFs) 184a, 184b, routing of control plane information towards access and mobility management functions (AMFs) 182a, 182b, and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one session management function (SMF) 183a, 183b, and at least one Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of NAS signaling, mobility management, and the like. Network slicing may be used by the AMF 182a, 182b, e.g., to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, e.g., to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In an embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to any of: WTRUs 102a-d, base stations 114a-b, eNode-Bs 160a-c, MME 162, SGW 164, PGW 166, gNBs 180a-c, AMFs 182a-b, UPFs 184a-b, SMFs 183a-b, DNs 185a-b, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Introduction

In the context of WTRU mobility, 3GPP has specified in NR Rel-16 a feature referred to as "Conditional Handover (CHO)". This feature focuses on reducing the number of failure occurrences while a WTRU is moving, such as when a handover between cells fails or when a connection fails even before a handover (HO) is triggered.

In an example CHO procedure, instead of preparing one target cell as in a legacy handover (HO) procedure, multiple candidate target cells may be prepared in advance by the network. This may enable a HO command to be sent to the WTRU earlier than is conventional (e.g., when the radio conditions are still satisfactory), rather than when conditions start to degrade as in a legacy HO procedure.

Upon receipt of a CHO command, the WTRU may store the command, instead of applying it immediately. For example, the WTRU may apply (e.g., only apply) the CHO command when a condition configured in the WTRU is satisfied for one of the configured candidate target cells, and then the WTRU may execute the HO and connect to the target cell as in a legacy HO.

In the context of mobility robustness optimization (MRO), two HO procedures are currently defined by 3GPP in an attempt to decrease the number of failed HOs, mainly for WTRUs in mobility. CHO may be directed to a similar decrease while in DAPS (Dual Active Protocol Stack). In the context of DAPS, transmission and/or reception (Tx/Rx) may continue in the source cell, even after HO has been decided and not yet completed, in an attempt to reduce HO interruption time for URLLC.

In CHO, the RAN may configure the WTRU with one or more conditions (e.g., CHO conditions) to monitor. This may be any of an event 'CondEventA3' (e.g., a current cell measurement below a threshold #1) or an event 'CondEventA5' (e.g., a current cell measurement below a threshold #1 and a candidate target cell measurement higher than a threshold #2). In certain representative embodiments, the WTRU may be capable of monitoring better conditions from other cells and/or beams other than, or in addition to, the cells and/or beams informed by the RAN and/or there may exist sufficient stability and radio conditions in other cells than in a list provided by the RAN.

For example, a DAPS HO may be characterized by: a) continued transmission in the source cell after receiving the HO request; b) simultaneous reception of user data from source and target cells; and c) uplink transmission of user data switched to target cell at completion of random access procedure at target cell. To transmit downlink user data from both the source and target cells, the network forwards duplicate user data between the source and target cells. The simultaneous reception of user plane (UP) data at the WTRU from both source and target cell may be a (e.g., significant) burden on RAN elements, such as the gNBs. Certain embodiments described herein may advantageously provide an efficient strategy for data forwarding on the basis that, in many cases, it is difficult to predict the next target cell, such as in the context of WTRU mobility.

Figure 2:
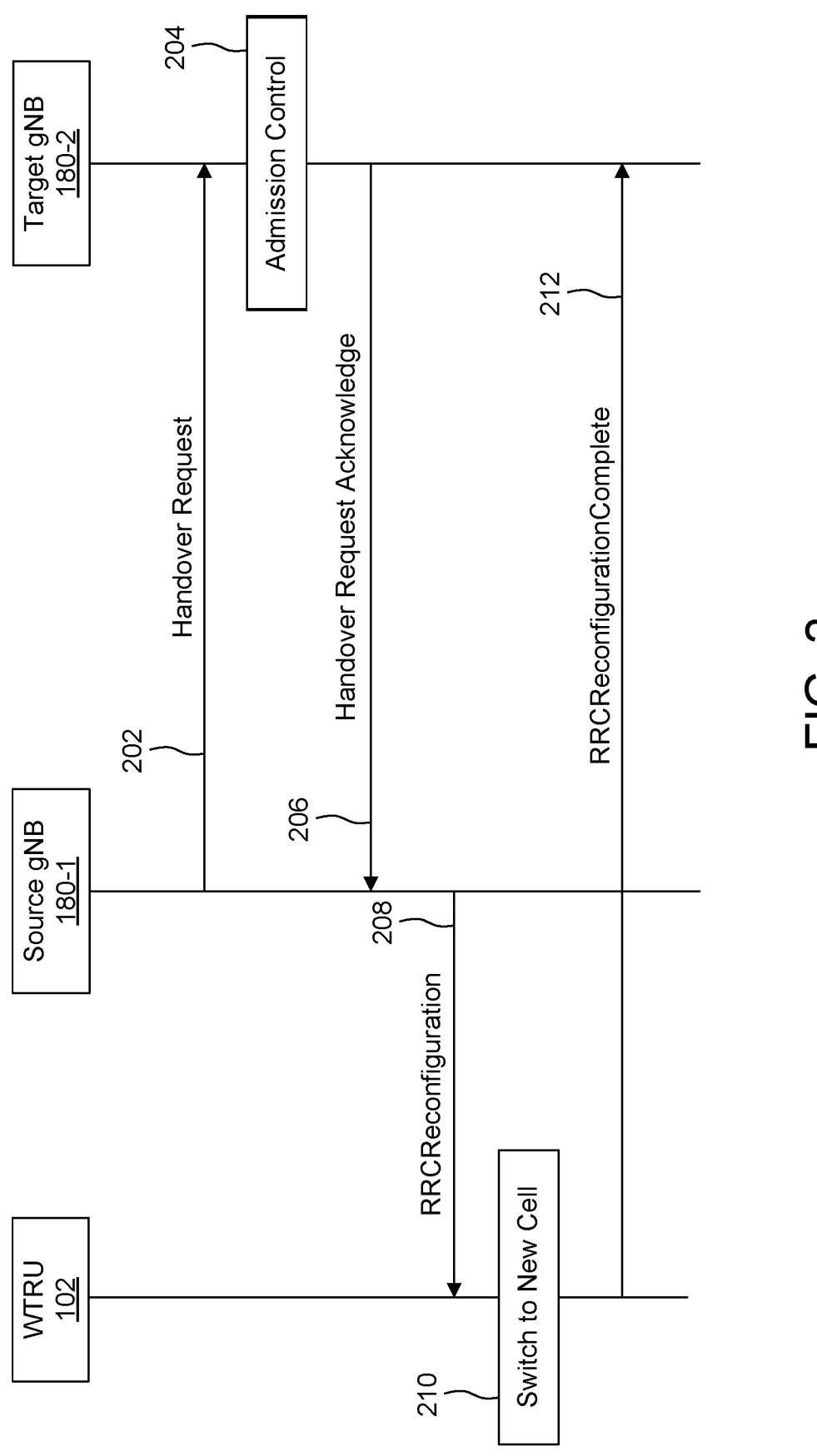
FIG. 2 is a signaling diagram illustrating a representative example of an inter-gNB handover (HO) procedure that may be used within the communications system illustrated in FIG. 1A.

FIG. 2 is a signaling diagram illustrating a representative example of an inter-gNB HO procedure that may be used within the communications system illustrated in FIG. 1A. As shown in FIG. 2, at 202, a source gNB 180-1 may initiate a handover (HO) and issue a handover request, such as over the Xn interface. At 204, a target gNB 180-2 performs admission control and provides the new RRC configuration as part of a handover request acknowledge at 206. At 208, the source gNB 180-1 may provide a RRC configuration to the WTRU 102 by forwarding a RRCReconfiguration message received in the handover request acknowledge. The RRCReconfiguration message may include at least a cell ID and any (e.g., all) information required to access the target cell so that the WTRU 102 can access the target cell, such as without reading system information, at 210. For some cases, the information required for contention-based and contention-free random access can be included in the RRCReconfiguration message. The access information to the target cell may include beam specific information. At 212, the WTRU 102 may move the RRC connection to the target gNB and replies with the RRCReconfigurationComplete.

Figure 3:
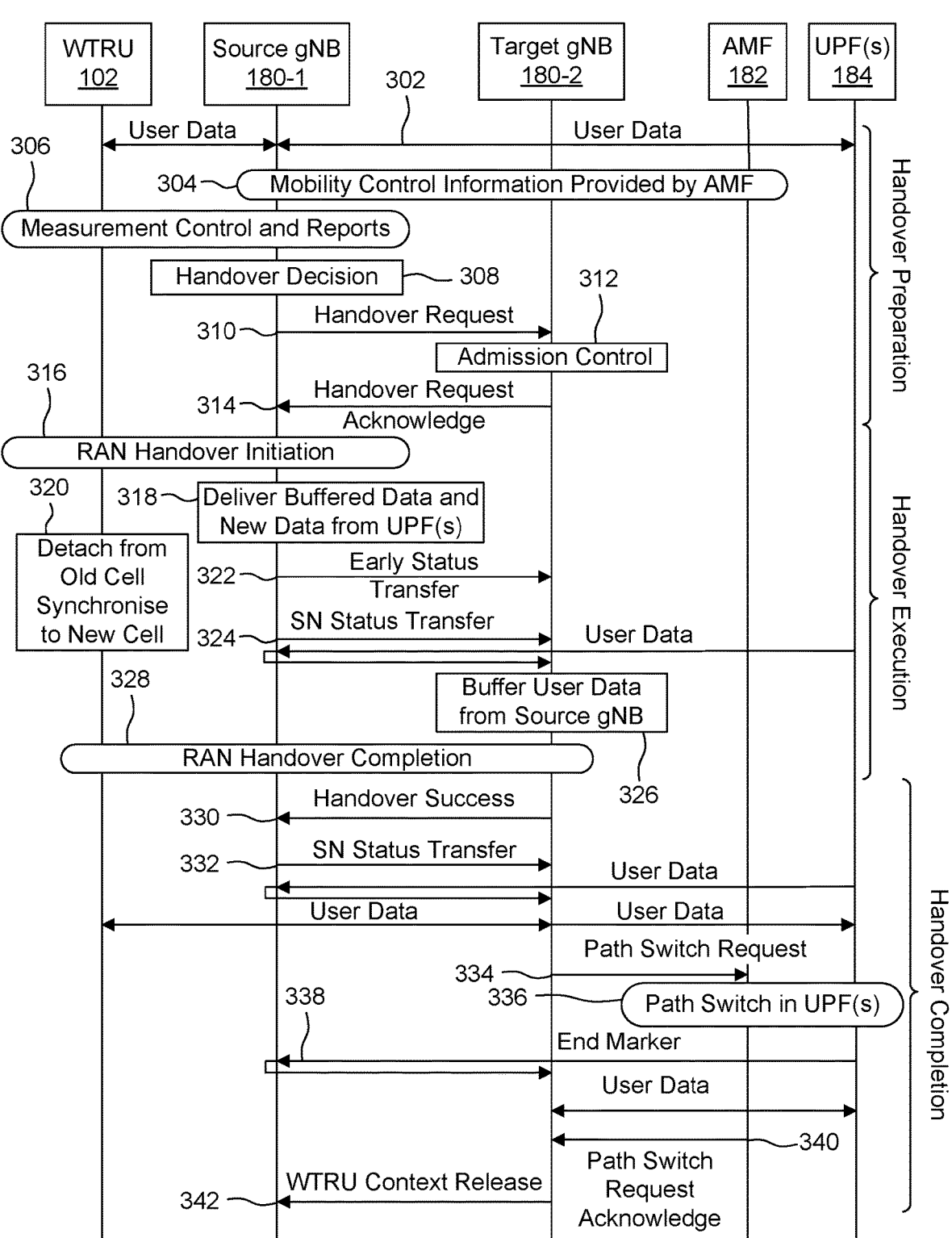
FIG. 3 is a signaling diagram illustrating a representative example of a HO procedure that may be used within the communications system illustrated in FIG. 1A.

FIG. 3 is a signaling diagram illustrating a representative example of a HO procedure that may be used within the communications system illustrated in FIG. 1A to communicate user data at 302. FIG. 3 shows a HO procedure where neither the AMF 182 nor the UPF 184 changes. As shown in FIG. 3, at 304, the WTRU context within the source gNB 180-1 contains information regarding roaming and access restrictions which were provided either at connection establishment or at a last TA update. At 306, the source gNB 180-1 may configure the WTRU measurement procedures and the WTRU reports according to the measurement configuration. At 308, the source gNB 180-1 may decide to handover the WTRU, such as based on MeasurementReport and RRM information. At 310, the source gNB 180-1 may issue a Handover Request message to the target gNB 180-2 by passing a transparent RRC container with necessary information to prepare the handover at the target side. The information may include at least the target cell ID, KgNB*, the C-RNTI of the WTRU 102 in the source gNB 180-1, RRM-configuration including WTRU inactive time, basic AS-configuration including antenna Info and DL Carrier Frequency, the current QoS flow to DRB mapping rules applied to the WTRU, the SIB1 from the source gNB 180-1, the WTRU capabilities for different RATs, PDU session related information, and can include the WTRU reported measurement information including beam-related information if available. The PDU session related information includes the slice information and QoS flow level QoS profile(s). The source gNB 180-1 may also request a DAPS handover for one or more DRBs. At 312, admission control may be performed by the target gNB 180-2. For example, slice-aware admission control may be performed if the slice information is sent to the target gNB 180-2. If the PDU sessions are associated with non-supported slices the target gNB 180-2 shall reject such PDU Sessions. At 314, the target gNB 180-2 may prepare the handover with L1/L2 and send the handover request acknowledge to the source gNB 180-1, which includes a transparent container to be sent to the WTRU 102 as an RRC message to perform the handover. The target gNB 180-2 may also indicate if a DAPS handover is accepted. At 316, the source gNB 180-1 may trigger the Uu handover by sending an RRCReconfiguration message to the WTRU 102, containing the information required to access the target cell: at least the target cell ID, the new C-RNTI, the target gNB 180-2 security algorithm identifiers for the selected security algorithms. It may also include a set of dedicated random access channel (RACH) resources, the association between RACH resources and SSB(s), the association between RACH resources and WTRU-specific CSI-RS configuration(s), common RACH resources, and system information of the target cell, etc. At 318, the source gNB 180-1 may deliver buffered data and/or new data from the UPF(s) 184 to the WTRU 102. At 320, the WTRU 102 may detach from the old cell and synchronize to the new cell.

In FIG. 3, at 322, for DRBs configured with DAPS, the source gNB 180-1 may send an early status transfer message. A DL count value conveyed in the early status transfer message may indicate PDCP SN and HFN of the first PDCP SDU that the source gNB 180-1 forwards to the target gNB 180-2. For example, the source gNB 180-1 may not stop assigning SNs to downlink PDCP SDUs until it sends the SN status transfer message to the target gNB 180-2 at 332. At 324, for DRBs not configured with DAPS, the source gNB 180-1 may send the SN status transfer message to the target gNB 180-2 to convey the uplink PDCP SN receiver status and the downlink PDCP SN transmitter status of DRBs for which PDCP status preservation applies (i.e. for RLC AM). The uplink PDCP SN receiver status may include at least the PDCP SN of the first missing UL PDCP SDU and may include a bit map of the receive status of the out of sequence UL PDCP SDUs that the WTRU 102 may need to retransmit in the target cell, if any. The downlink PDCP SN transmitter status may indicate the next PDCP SN that the target gNB 180-2 shall assign to new PDCP SDUs, not having a PDCP SN yet. At 328, the WTRU 102 may synchronize to the target cell and completes the RRC handover procedure by sending a RRCReconfigurationComplete message to the target gNB 180-2. In case of DAPS handover, the WTRU 102 may not detach from the source cell upon receiving the RRCReconfiguration message. For example, the WTRU 102 releases the source resources and configurations and stops DL/UL reception/transmission with the source upon receiving an explicit release from the target node. At 330 and 332, in the case of DAPS handover, the target gNB 180-2 may send a HO success message to the source gNB 180-1 to inform that the WTRU 102 has successfully accessed the target cell. In return, the source gNB 180-1 may send the SN status transfer message for DRBs configured with DAPS as applicable, and the normal data forwarding may be performed. At 334, the target gNB 180-2 may send a path switch request message to the AMF to trigger the 5GC to switch the DL data path towards the target gNB 180-2 and to establish an NG-C interface instance towards the target gNB 180-2. At 336, the 5GC switches the DL data path towards the target gNB 180-2. The UPF 184 may send one or more "end marker" packets on the old path to the source gNB 180-1 per PDU session/tunnel at 338 and then may release any U-plane/TNL resources towards the source gNB 180-1. At 340, the AMF 182 may confirm the path switch request message with a path switch request acknowledge message. At 342, on reception of the path switch request acknowledge message from the AMF, the target gNB 180-2 may send a WTRU context release to inform the source gNB 180-1 about the success of the handover. The source gNB 180-1 may then release radio and C-plane related resources associated to the WTRU context. Ongoing data forwarding may continue.

Figure 4:
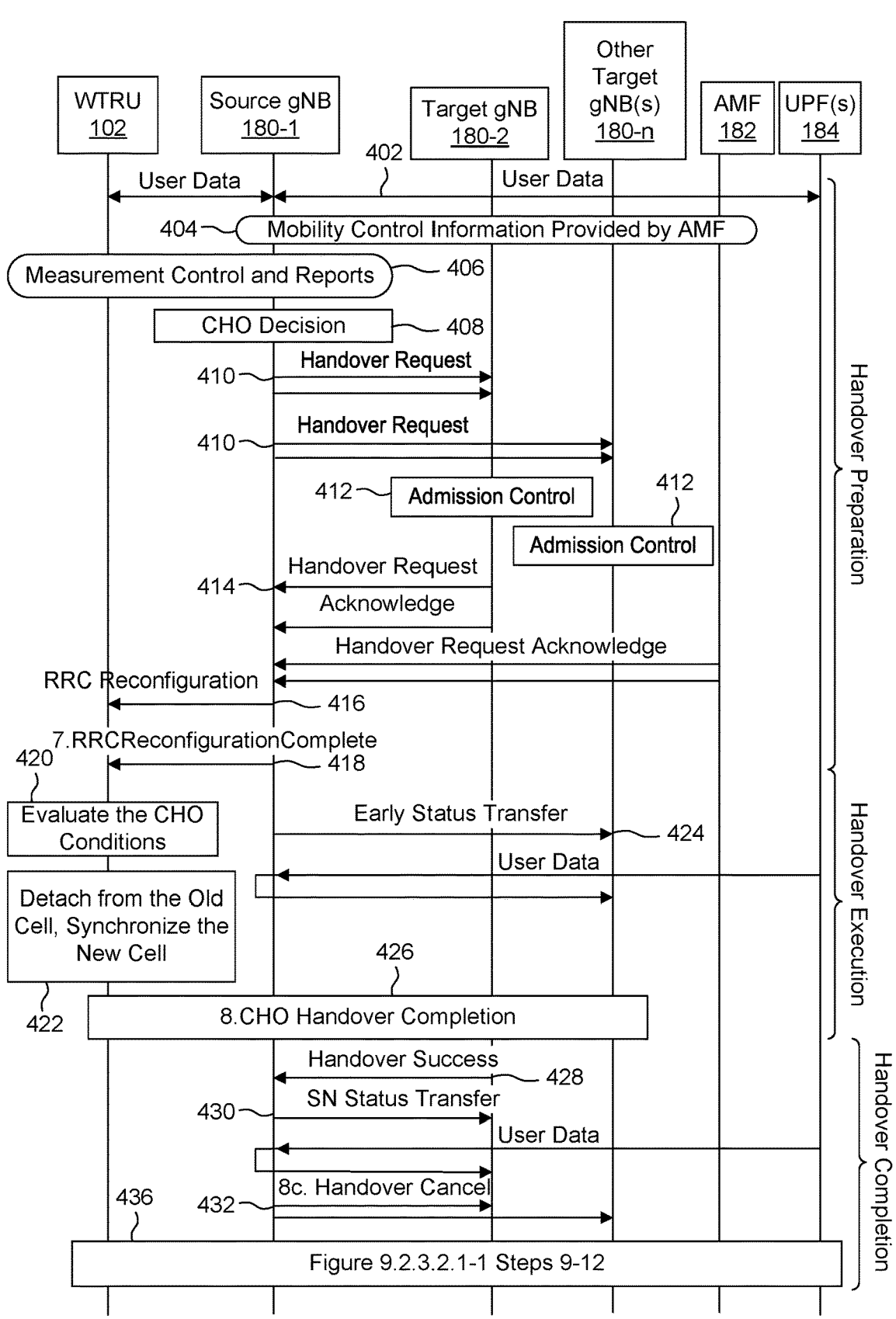
FIG. 4 is a signaling diagram illustrating a representative example of a conditional HO (CHO) procedure that may be used within the communications system illustrated in FIG. 1A.

FIG. 4 is a signaling diagram illustrating a representative example of a CHO procedure that may be used within the communications system illustrated in FIG. 1A. FIG. 4 shows an example intra-AMF/UPF CHO procedure where neither the AMF nor the UPF changes and user data 402 may be communicated to the WTRU 102. In FIGS. 4, 404 and 406 may be performed similarly to 304 and 306 in FIG. 3. At 408, the source gNB 180-1 may determine to use CHO. At

410, the source gNB 180-1 may request CHO for one or more candidate cells belonging to one or more candidate gNBs 180-2, 180-n. A CHO request message may be sent for each candidate cell. In FIG. 4, 412 may be performed similarly to 312 in FIG. 3. At 414, the candidate gNB(s) may send a CHO response (e.g., HO request acknowledge) which may include a configuration of the CHO candidate cell(s) to the source gNB 180-1. The CHO response message may be sent for each candidate cell. At 416, the source gNB 180-1 may send an RRCReconfiguration message to the WTRU 102, which may contain the configuration of CHO candidate cell(s) and CHO execution condition(s). At 418, the WTRU 102 may send an RRCReconfigurationComplete message to the source gNB 180-1. At 424, if early data forwarding is applied, the source gNB 180-1 may send the early status transfer message. At 420, the WTRU 102 may maintain the connection with the source gNB 180-1 after receiving CHO configuration(s), and starts evaluating the CHO execution conditions for the candidate cell(s). If at least one CHO candidate cell satisfies the corresponding CHO execution condition, the WTRU 102 may detach from the source gNB 180-1, apply the stored corresponding configuration for that selected candidate cell, synchronize to that candidate cell at 422 and complete the RRC handover procedure at 426 by sending a RRCReconfigurationComplete message to the target gNB 180-2. The WTRU 102 may release stored CHO configurations after successful completion of RRC handover procedure. At 428 and 430, the target gNB 180-2 may send a handover success message to the source gNB 180-1 to inform that the WTRU 102 has successfully accessed the target cell. In return, the source gNB 180-1 may send the SN status transfer message, such as similar to 7. of FIG. 3. At 432, the source gNB 180-1 may send a HO cancel message toward the other signaling connections or other candidate target gNB 180-2s, if any, to cancel CHO for the WTRU 102. At 436, steps 9-12 of FIG. 9.2.3.2.1-1 of 3GPP 38.300 may be performed.

Those skilled in the art should be familiar with the signaling procedures illustrated in FIGS. 2 to 4.

Overview

Figure 5:
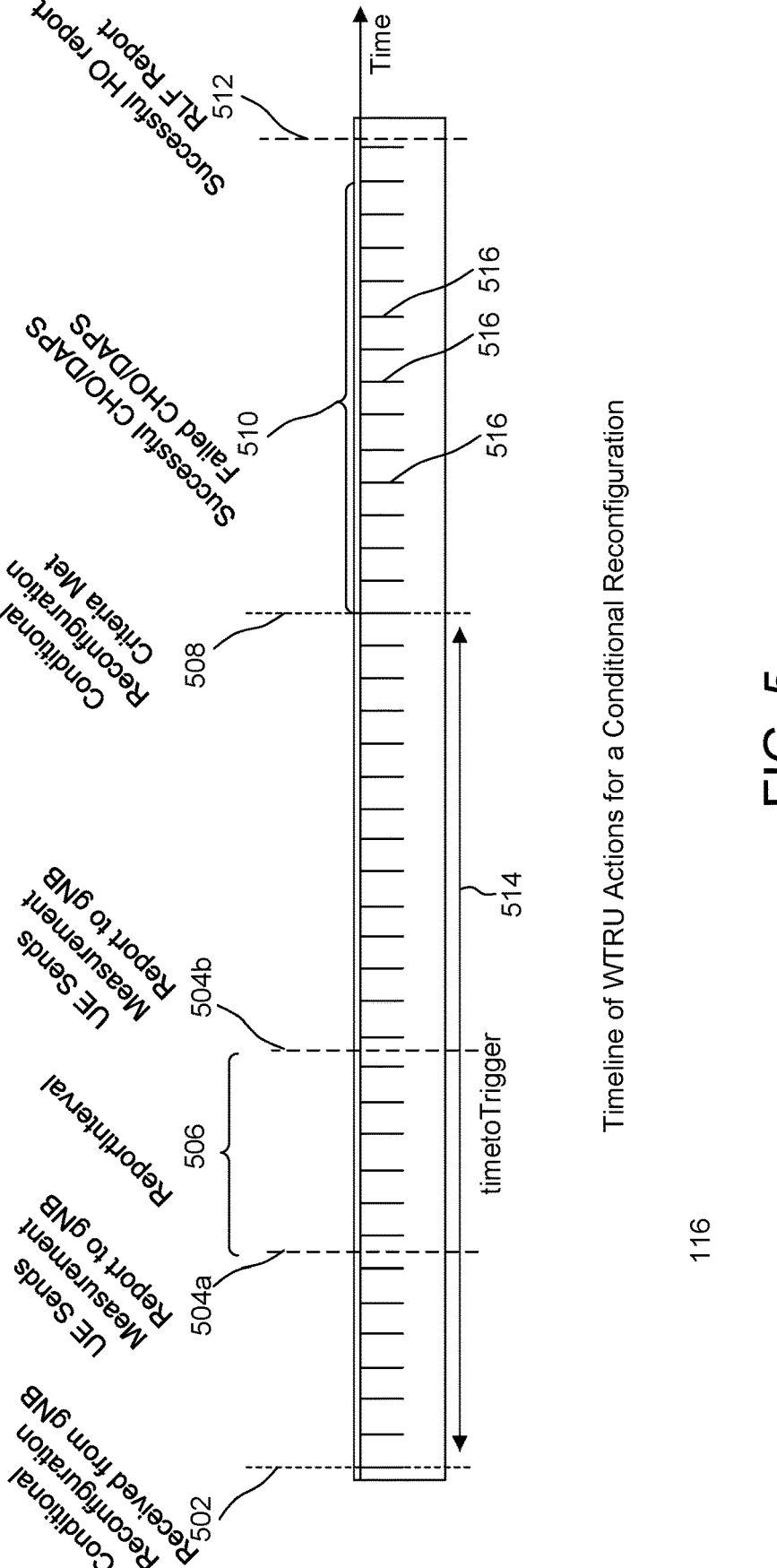
FIG. 5. is a timing diagram illustrating a representative timeline of UE actions for a conditional reconfiguration.

FIG. 5 is a timing diagram illustrating a representative timeline of WTRU actions for a conditional reconfiguration. At 502, the gNB 180-1 may send an RRCReconfiguration message to the WTRU 102 which may include the information elements (IEs) CondReconfigToAddModList and ReportConfigNR instructing the UE on which cells, beams, and/or quantities to measure and how to measure them. At 504a and 504b, the WTRU 102 may periodically send measurement reports to the gNB (e.g., if requested by the gNB) as configured by a parameter reportInterval 506. For example, the WTRU 102 may include measurement results in the form of average values, such as after Layer 3 filtering, for cells, beams, and/or quantities to be reported. Prior to 508, the WTRU 102 may continue (e.g., periodically) evaluate the conditional reconfiguration criteria. At 508, the WTRU 102 may determine that the conditional reconfiguration criteria is satisfied (e.g., for a configured duration). After the reconfiguration is triggered (e.g., based on meeting the conditional reconfiguration criteria), the outcome at 510 may be any of a successful CHO, a successful DAPS HO, a failed CHO or a failed DAPS HO. On condition the HO outcome at 510 is successful, the WTRU 102 may proceed at 512 to send a successful HO (SHO) report via the target reconfiguration cell at the target gNB 180-2. On condition the HO outcome at 510 is unsuccessful, the WTRU 102 may proceed at 512 to send a Radio Link Failure (RLF) report, such as to whatever cell it managed to re-establish connection at (e.g., via the gNB that controls the cell associated with the re-established connection).

In FIG. 5, 514 denotes a parameter timetoTrigger that may define a time expiry (e.g., a time period for expiration) for the current conditional reconfiguration criteria. In FIG. 5, it is assumed that 508 happens prior to the expiry of timetoTrigger (e.g., lapsing of the expiration time period). In FIG. 5, 516 denotes measurement time points or intervals or windows at which the WTRU 102 perform measurements. For example, the measurements at the time points may be filtered using a Layer 3 filtering formula for evaluation purposes. The number of data points is given by how many occurrences of a measurement gap repetition period (e.g., mgrp) that the WTRU 102 can count inside a certain time window. This number may be very large and may potentially be (e.g., slightly) reduced due to misalignment between the measurement configuration and a SSB/PBCH window configuration (e.g., mgrp and a measurement timing configuration such as smtc1).

For the unsuccessful CHO/DAPS HO cases, improvements may be implemented. For the successful CHO/DAPS HO cases, the fact that the HO procedure ended correctly does not mean that no improvements are possible. There are opportunities to improve aspects related to the conditional reconfiguration criteria, the measurement configuration and/or the timetoTrigger parameter.

The gNB 180-1 may (e.g., only) rely on the available measurement data provided from the WTRU 102 to try to improve the procedure. For example, the gNB 180-1 may receive three measurement data points, such as one value per quantity (e.g., RSRP, RSRQ, SINR, RSCP, EcN0) for a respective cell and/or beam that a WTRU 102 is configured to report. A first measurement data point may be sent after averaging the last number of samples given by parameters nrofSS-BlocksToAverage and nrofCSI-RS-ResourcesToAverage, in a first measurement report (e.g., 504a in FIG. 5). A second measurement data point may follow the same logic and may be delivered to the gNB in a second measurement report (e.g., 504b in FIG. 5). A third measurement data point may also follow the same logic and may be included in SHO or RLF reports, depending on the outcome of the HO procedure. In other examples, there may be more or fewer measurements before the CHO/DAPS is triggered at 508 in FIG. 5 depending on the amount of time between 502 and 508.

Such an approach to collection of the measurement data points may be insufficient for a more robust evaluation of the conditional reconfiguration criteria, the measurement configuration and the parameter timetoTrigger. For example, the (e.g., three) measurement data points may be spread over a period of time, which may be given by timetoTrigger, (e.g., up to 5120 milliseconds). As an example, a WTRU 102 may collect (e.g., be capable of collecting) a measurement data point at any (e.g., every) mgrp, such as 20 ms, which corresponds to a theoretical maximum of 256 measurement data points. For example, the number of data points may only be valid until timetoTrigger has expired or elapsed.

After conditional reconfiguration execution and until either SHO or RLF reports are sent to the gNB, there may be more data points measured by the WTRU 102. Logically, the number of data points after execution may depend on the time for the WTRU 102 to send one of these reports after the conditional reconfiguration was triggered.

Failure Cases

Figure 6:
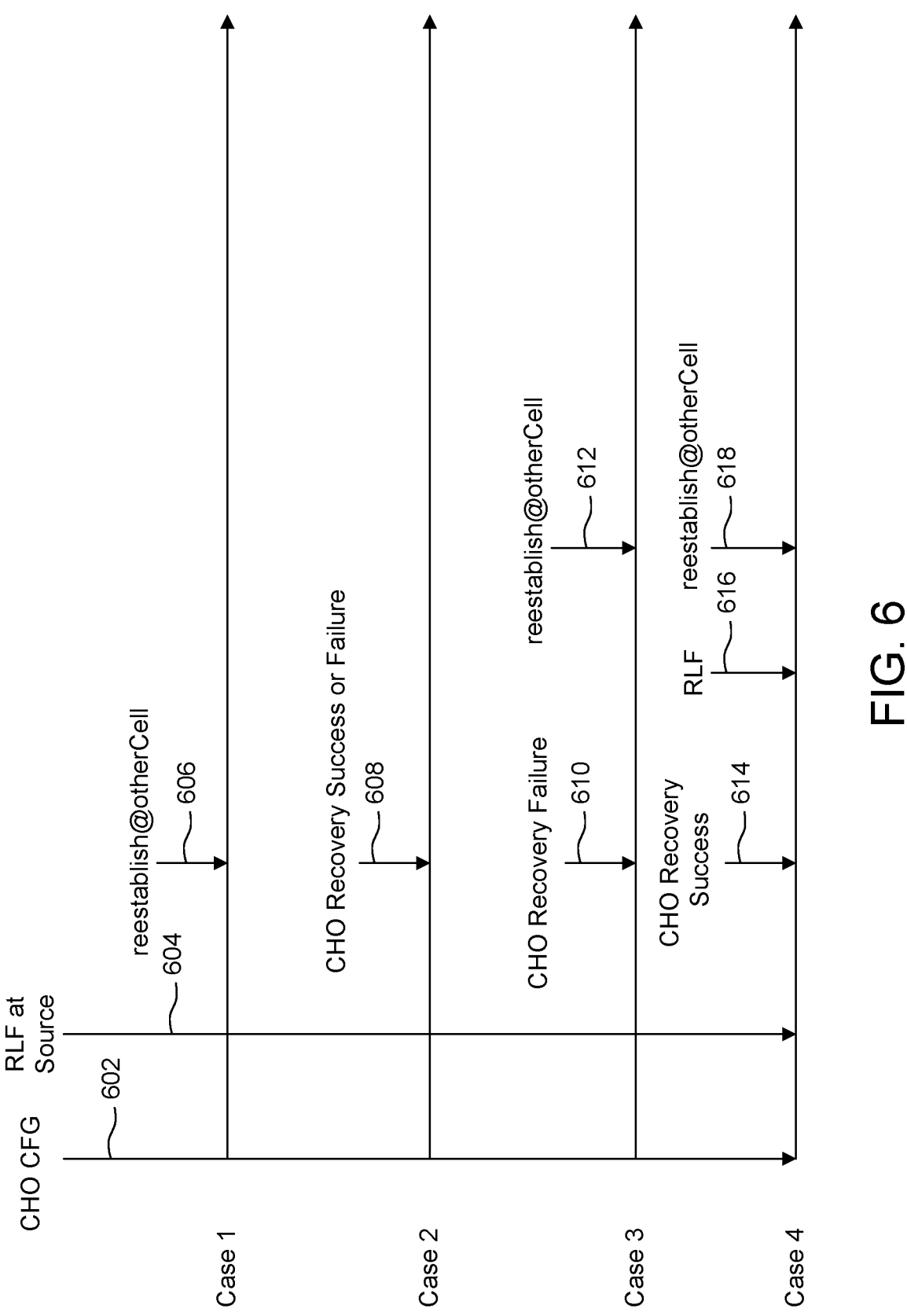
FIG. 6 is a timing diagram illustrating representative CHO failure cases.

In certain CHO/DAPS examples, a HO may fail in different ways (e.g., too early, too late, wrong cell). FIG. 6 is a timing diagram illustrating representative CHO failure cases in which CHO may be performed too late. As shown in FIG. 6, in each of cases 1 to 4, a WTRU 102 may receive a CHO configuration (CFG) at 602 and may afterwards experience a radio link failure (RLF) at a source cell at 604. In case 1, the WTRU 102 may proceed to perform a connection re-establishment procedure at another cell at 606. In case 2, the WTRU 102 may proceed to perform CHO recovery procedure at 608 which may be successful or may fail. In case 3, the CHO recovery at 610 may fail and the WTRU 102 may proceed to perform a connection re-establishment procedure at another cell at 612. In case 4, the CHO recovery at 614 may be successful and the WTRU 102 may then undergo a RLF at 616. After, the WTRU 102 may proceed to perform a connection re-establishment procedure at another cell at 618. For example, the CHO CFG may arrive too late (e.g., too close) to the occurrence of the RLF for the WTRU 102 to attempt to perform a CHO. As another example, the CHO CFG was insufficient for the WTRU 102 to trigger a CHO prior to RLF.

Figure 7:
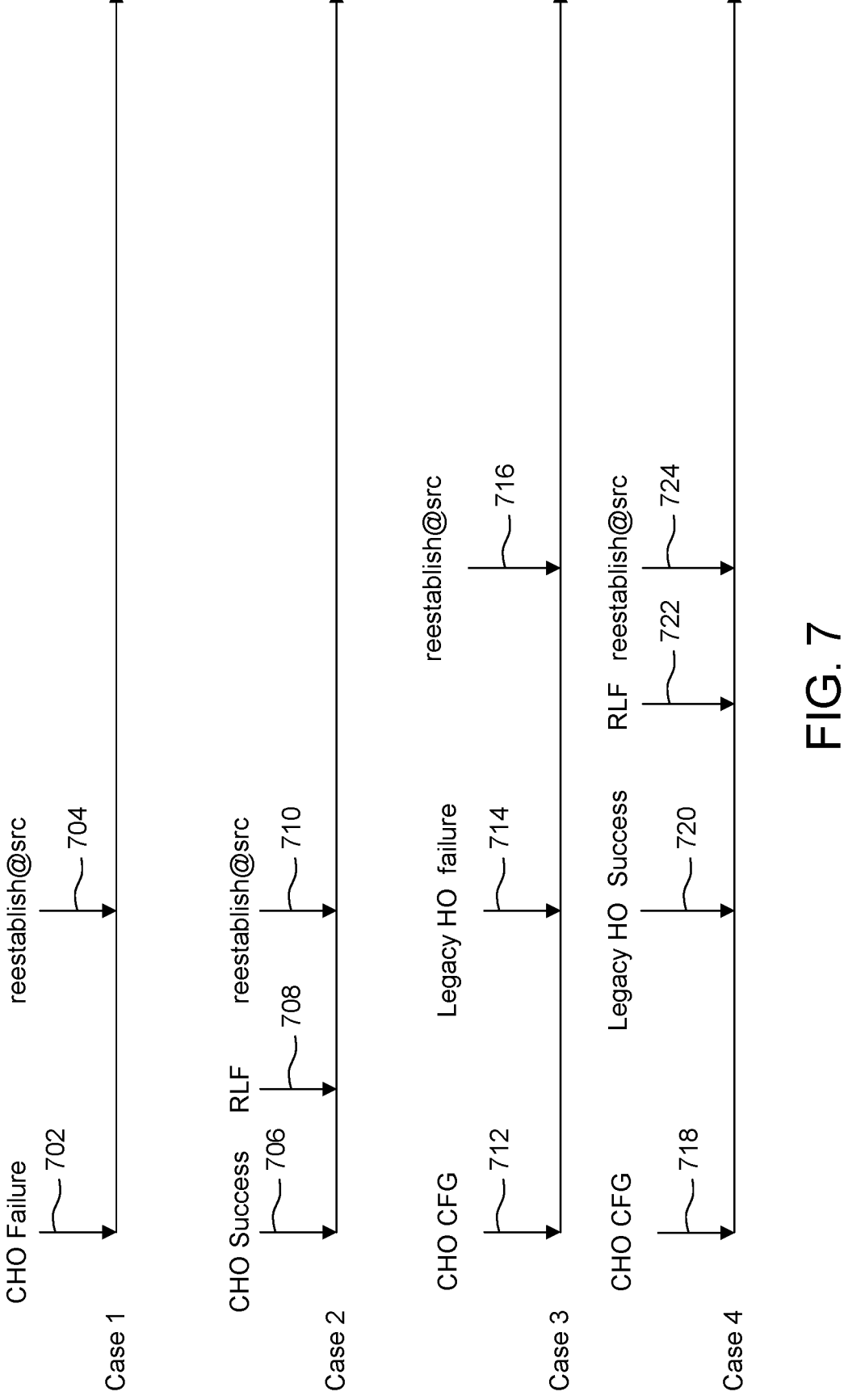
FIG. 7 is a timing diagram illustrating other representative CHO failure cases.

FIG. 7 is a timing diagram illustrating other representative CHO failure cases in which CHO may be performed too early. In case 1, a WTRU 102 may experience a CHO failure at 702 and may proceed to perform a connection re-establishment procedure at the source cell at 704. In case 2, the WTRU 102 may complete a successful CHO at 706 and then have a RLF at 708. After, the WTRU 102 may proceed to perform a connection re-establishment procedure at the source cell at 710. In case 3, a WTRU 102 may receive a CHO configuration (CFG) at 712 and may afterwards experience a legacy HO failure at 714. After, the WTRU 102 may proceed to perform a connection re-establishment procedure at the source cell at 716. In case 4, a WTRU 102 may receive a CHO configuration (CFG) at 718 and may afterwards complete a successful legacy HO at 720. After, the WTRU 102 may have a RLF at 722 and, after, the WTRU 102 may proceed to perform a connection re-establishment procedure at the source cell at 724.

Figure 8:
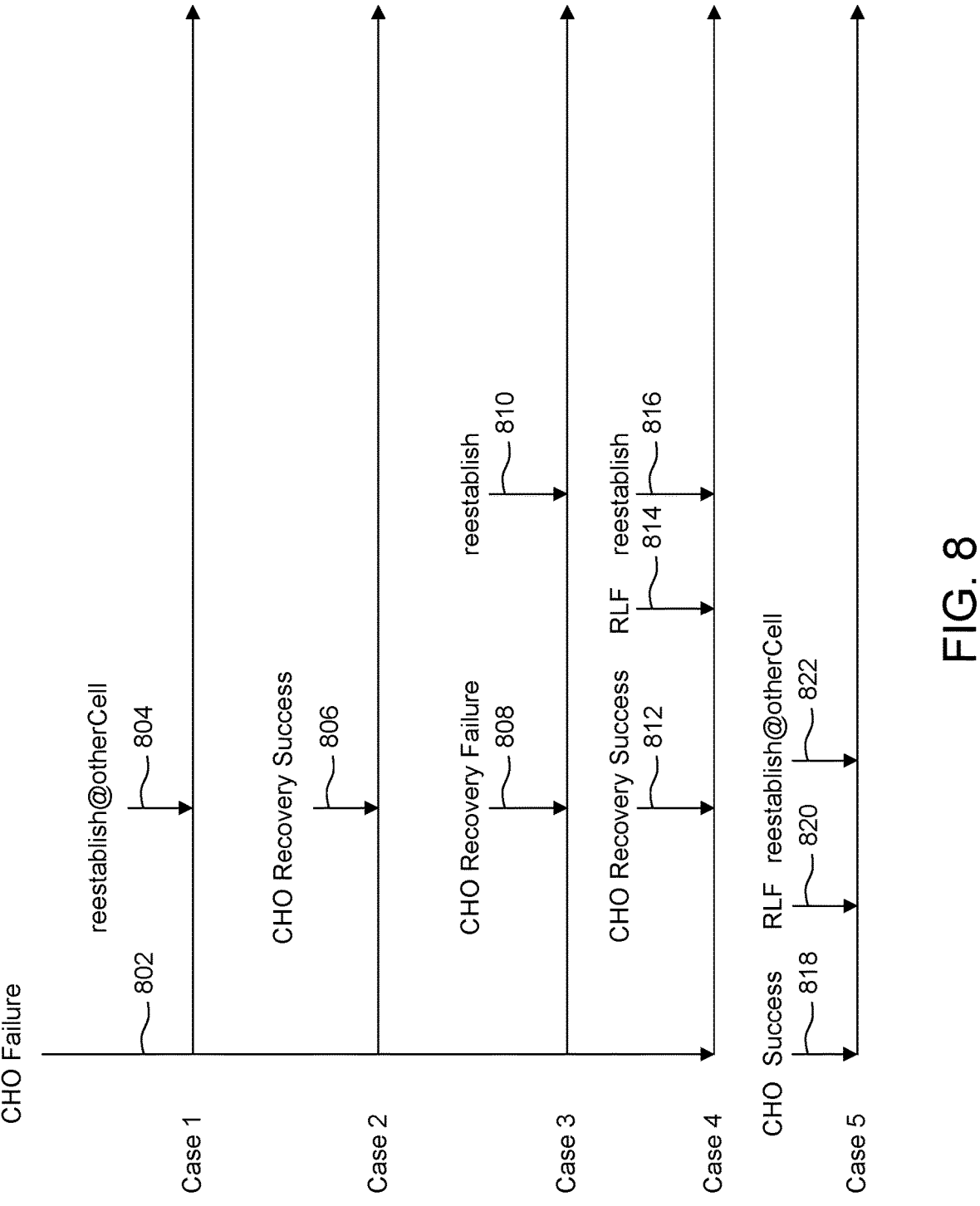
FIG. 8 is a timing diagram illustrating still other representative CHO failure cases.

FIG. 8 is a timing diagram illustrating still other representative CHO failure cases in which CHO may be performed with respect to a wrong cell. In cases 1 to 4, a WTRU 102 may first experience a CHO failure at 802. In case 1, a WTRU 102, after CHO failure at 802, may proceed to perform a connection re-establishment procedure at another (e.g., wrong) cell at 804. In case 2, the WTRU 102 may complete a successful CHO recovery 806. In case 3, the WTRU 102 may proceed to a CHO recovery which fails at 808 and may proceed to perform (e.g., attempting to perform) connection re-establishment (e.g., at the wrong cell) afterwards at 810. In case 4, the WTRU 102 may proceed to perform a successful CHO recovery at 812 and, after, may have a RLF at 814. After the RLF at 814, the WTRU 102 may proceed to performing (e.g., attempting to perform) connection re-establishment (e.g., at the wrong cell) at 816. In case 5, the WTRU 102 may perform a successful CHO at 818 and, after, may have a RLF at 820. The WTRU 102 may proceed to performing (e.g., attempting to perform) connection re-establishment at another (e.g., wrong) cell at 822.

As shown in FIGS. 6 to 8, any of a RLF may occur at a source cell, a RLF may occur at a target cell, a CHO recovery may be successful, a CHO recovery may fail, connection re-establishment may occur at the source cell, connection re-establishment may occur at another cell, and/or the CHO may be successful.

Figure 9:
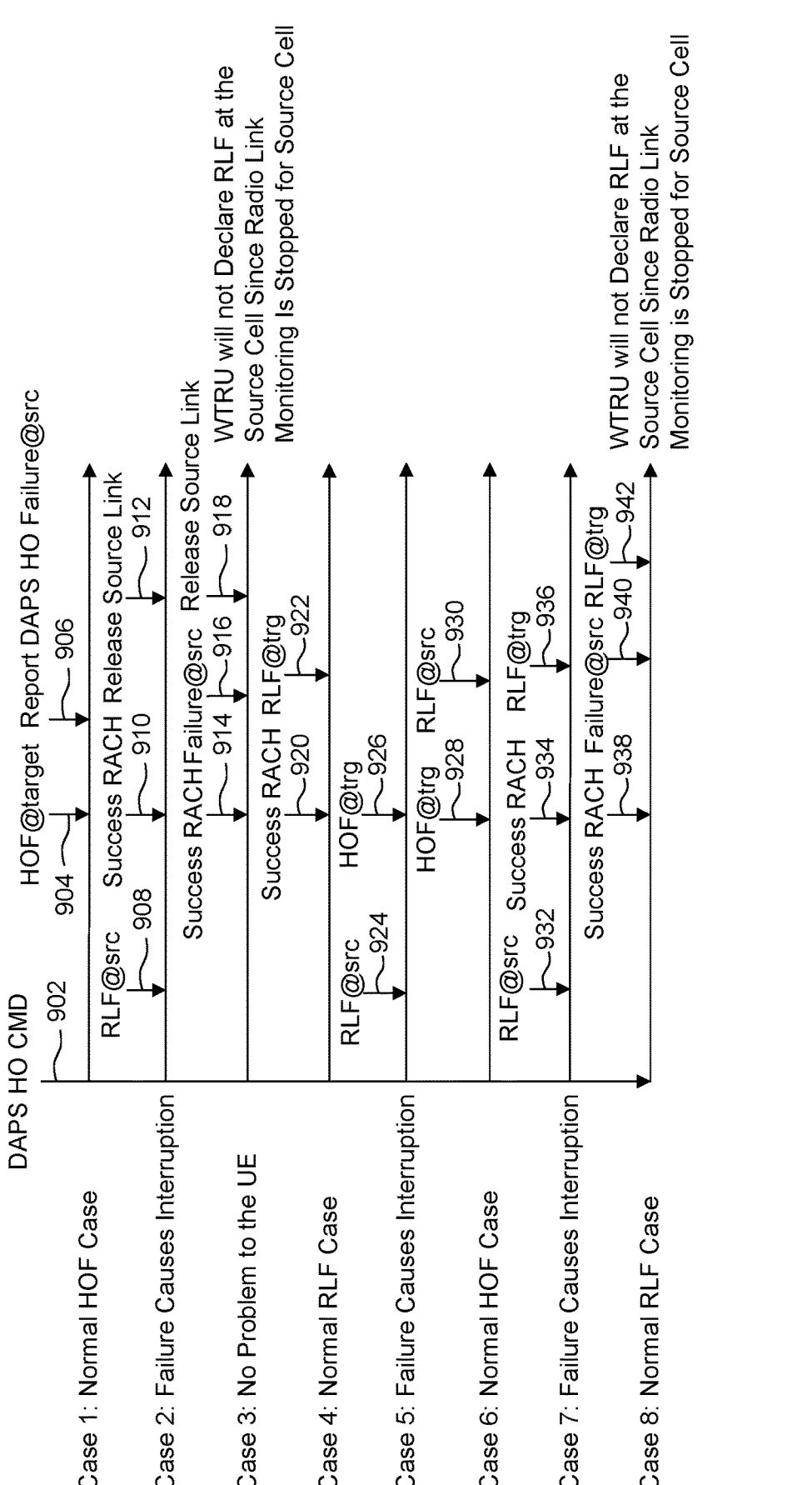
FIG. 9 is a timing diagram illustrating representative dual active protocol stack (DAPS) HO failure cases.

FIG. 9. is a timing diagram illustrating representative DAPS HO failure (HOF) cases. In cases 1 to 9, a UE may receive a DAPS HO command (CMD) at 902. In case 1, a HOF may fail at a target cell at 904. The WTRU 102 may report the DAPS HO failure at the source cell at 906. In case 2, a RLF occurs with respect to (e.g., at) the source cell at 908. After, the WTRU 102 may perform a successful RACH procedure at 910 and then release the source link at 912. In case, 2, the failure may cause an interruption at the WTRU 102. In case 3, the WTRU 102 may perform a successful RACH at 914. After, a failure may occur at the source cell at 916 and the WTRU 102 may release the source link at 918. For example, the WTRU 102 may not declare a RLF at the source cell since radio link monitoring is stopped for the source cell. In case 4, the WTRU 102 may perform a successful RACH at 920 and a RLF may occur at a target cell at 922. In case 5, a RLF may occur at the source cell at 924 and a HOF may occur at a target cell at 926. In case 5, the failure may cause an interruption at the WTRU 102. In case 6, a HOF may occur at a target cell at 928 and a RLF may occur at a source cell at 930. In case 7, a RLF may occur at the source cell at 932. After, the WTRU 102 may perform a successful RACH at 934 and then a RLF may occur at the target cell at 936. In case 7, the failure may cause an interruption at the WTRU 102. In case 8, the WTRU 102 may perform a successful RACH at 938 and then a failure may occur at the source cell at 940. After, a RLF may occur at the target cell at 942. For example, the WTRU 102 may not declare a RLF at the source cell since radio link monitoring is stopped for the source cell.

As shown in FIG. 9, any of a RLF may occur at the source cell, a RLF may occur at a target cell, a HOF may occur at the target cell, and/or a RACH procedure may be successful.

Overview

Figure 10:
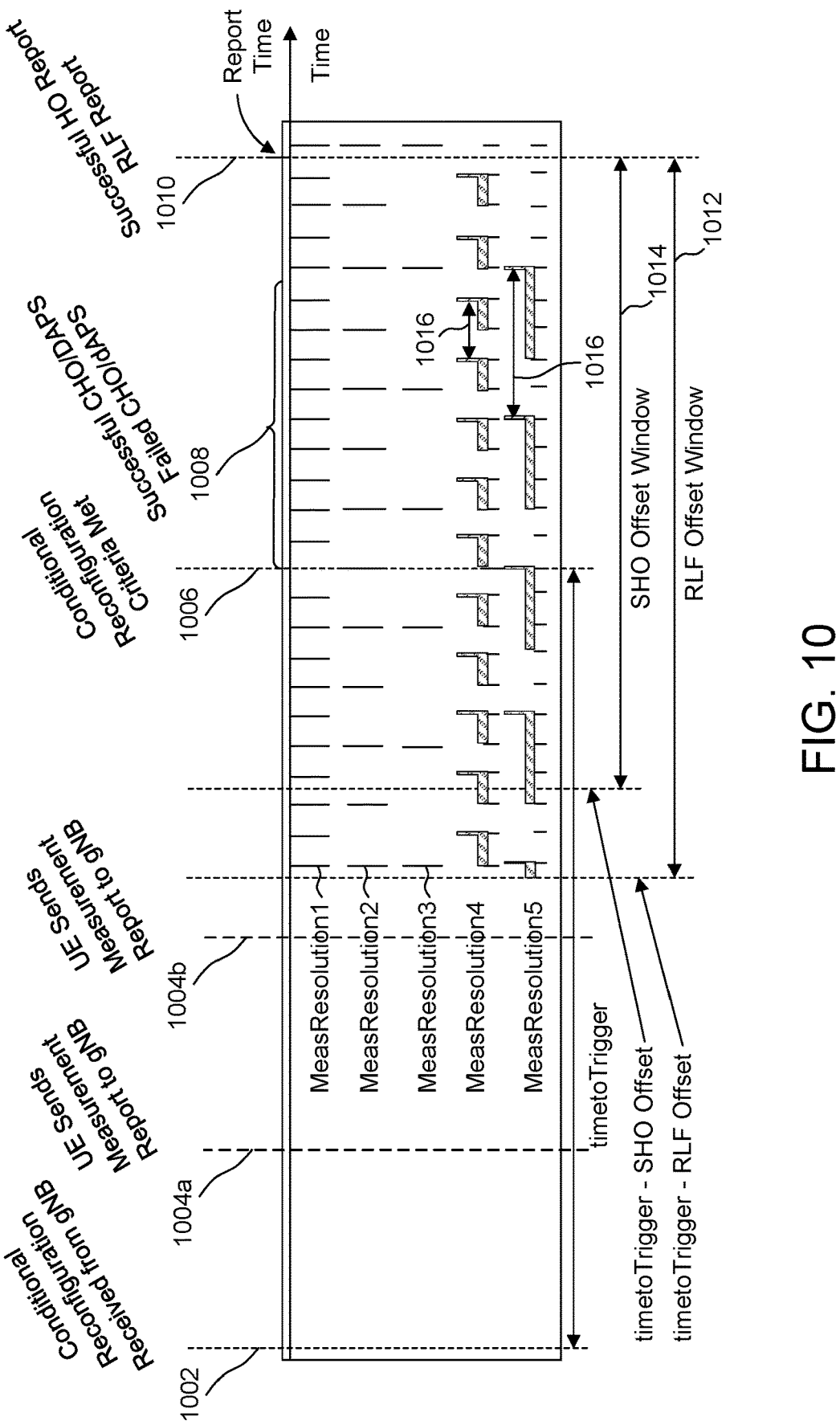
FIG. 10 is a is a timing diagram illustrating a representative timeline of UE actions for an enhanced conditional reconfiguration.

In certain representative embodiments, enhancements to conditional reconfiguration procedures may reduce the number of failures resulting from these procedures. Supplying a network node (e.g., gNB) with sufficient measurement data points may improve any of the evaluation of the conditional reconfiguration criteria, the measurement configuration and/or the value for parameter timetoTrigger. For example, a WTRU 102 may be instructed to store a certain number of measurement data points. The measurement data points may be reported to the gNB via the SHO and/or RLF reports.
Parameters for WTRU Configuration FIG. 10 is a is a timing diagram illustrating a representative timeline of WTRU actions for an enhanced conditional reconfiguration. In FIG. 10, at 1002, the gNB 180-1 may send an RRCReconfiguration message to the WTRU 102. At 1004*a* and 1004*b*, the WTRU 102 may periodically send measurement reports to the gNB 180-1. Prior to 1006, the WTRU 102 may continue to (e.g., periodically) evaluate the conditional reconfiguration criteria (e.g., one or more reconfiguration conditions). At 1006, the WTRU 102 may determine that the conditional reconfiguration criteria are satisfied. After the reconfiguration is triggered (e.g., based on meeting the conditional reconfiguration criteria), the outcome at 1008 may be any of a successful CHO, a successful DAPS HO, a failed CHO or a failed DAPS HO. On condition the HO outcome at 1004 is successful, the WTRU 102 may proceed at 1010 to send a successful HO (SHO) report via the target reconfiguration cell at the target gNB 180-2. On condition the HO outcome at 1008 is unsuccessful, the WTRU 102 may proceed at 1010 to send a Radio Link Failure (RLF) report, such as to whatever cell it managed to re-establish connection at (e.g., via the gNB that controls the cell associated with the re-established connection). In FIG. 10, 1002 to 1010 may occur, for example, in chronological order similar to FIG. 5.

In certain representative embodiments, the WTRU 102 may be configured with the following additional parameters (e.g., in addition to timetoTrigger and/or mgrp). For example, a RRCReconfiguration message may include any of a SHO threshold parameter, a RLF threshold parameter, and/or one or more measResolution parameters.

In certain representative embodiments, a RLF offset window 1012 represents a time window that may end at a same time as either a SHO or a RLF report is created (e.g., reportTime). For example, the RLF offset window may start at a certain point in time given by timetoTrigger–RLF offset. A value of the RLF offset parameter may be subtracted from the timetoTrigger to determine the RLF offset window 1012 which may define a starting point of the measurement data points to include in the SHO or RLF reporting. As another example, RLF offset window 1012 may start at a certain point in time defined as a next time interval that would have resulted in another periodic measurement or at the time of the periodic measurement 2b. As another example, the RLF offset window 1012 may be a predefined time period. RLF offset window 1012 represents the time window inside which the gNB will request more measurement data points from the WTRU 102, such as in a case where a conditional reconfiguration fails. In certain representative embodiments, the WTRU 102 may not know in advance of a value (e.g., the timestamp) of the reportTime. RLF offset is therefore a time parameter that indicates the time gap to consider before timetoTrigger.

In certain representative embodiments, a SHO offset window 1014 represents a time window that may end at a same time as either a SHO or a RLF a report is created (e.g., reportTime). For example, the SHO offset window 1014 may start at a certain point in time given by timetoTrigger–SHO offset. A value of the SHO offset parameter may be subtracted from the timetoTrigger to determine the SHO offset window 1014 which may define a starting point of the measurement data points to include in the SHO or RLF reporting. This represents the time window inside which the gNB will request more measurement data points from the WTRU 102, such as in a case where a conditional reconfiguration succeeds.

In certain representative embodiments, SHO offset and RLF offset may be indicated to the WTRU 102 by a single parameter value. In other representative embodiments, the SHO offset window 1014 and RLF offset window 1012 may be configured by the network to be different, such as when a gNB may request more measurement data points, such as over a longer time period, for the analysis of failure cases.

In certain representative embodiments, increasing the number and/or volume of measurement data points included the SHO or RLF reports will increase the amount of data sent over the air interface. It may be desirable that the amount of data which is reported is capable of being tuned to avoid situations where the gNB receives a massive number of measurement data points, such as for a successful HO cases where the analysis may be less complex because less optimization is required. In FIG. 10, measResolution is a parameter for measurement resolution that that indicates, to the WTRU 102, a measurement data point granularity, measurement data point periodicity and/or a number of measurement data points which may be included in or used for generating other measurement information (e.g., filtered/averaged data points) in the SHO and/or RLF reports. The WTRU 102 may receive one or multiple measResolution parameters. As shown in FIG. 10, measResolution1, measResolution2, measResolution3, measResolution4, and measResolution5 may indicate different measurement point granularities which may be associated with different measurement quantities (e.g., RSRP, RSRQ, SINR, RSCP or EcN0). A measResolution parameter can be of any form that allows the WTRU 102 to determine the number of data points requested by the gNB. For example, the measResolution may be a number, a periodicity equal to mgrp such as measResolution1 in FIG. 10, a periodicity greater than mgrp such as measResolution2 and/or measResolution3 in FIG. 10, etc. As another example, an absence of this parameter may indicate that the WTRU 102 may analyze the measurements it collects, and determine an appropriate value for measResolution. In FIG. 10, multiple measResolution values are shown.

In certain representative embodiments, a measResolution may correspond to a measurement data point periodicity which is higher than mgrp. This may result in fewer measurement data points as with measResolution2 and measResolution3 in FIG. 10. In certain representative embodiments, the WTRU 102 may also be configured with a number of measurement points (e.g., for a respective measurement quantity) to be averaged in the Layer 3 filtering formula. For example, conditional reconfiguration specific filtering parameters nrofSS-BlocksToAverage and/or nrofCSI-RS-ResourcesToAverage may be configured for SHO and RLF reporting. For example, these respective filtering parameters are indicated by 1016 in FIG. 10. These respective filtering parameters may be referred to as nrofSS-BlocksToAverage-SHO, nrofCSI-RS-ResourcesToAverage-SHO, nrofSS-BlocksToAverage-RLF and nrofCSI-RS-ResourcesToAverage-RLF. These four parameters may take values at the WTRU 102 in the intervals: [2; nrofSS-BlocksToAverage-SHOmax], [2; nrofCSI-RS-ResourcesToAverage-SHOmax], [2; nrofSS-BlocksToAverage-RLFmax] and [2; nrofCSI-RS-ResourcesToAverage-RLFmax], respectively. An absence of any of these values may indicate to the WTRU 102 that the WTRU 102 is responsible to select a value or that a predetermined default value is used.

A measResolution and one of the nrofSS-BlocksToAverage parameters may be used to configure data collection of a measurement quantity at the WTRU 102. For example, in FIG. 10, five different measurement reporting options (e.g., variations of measurement resolution) from the WTRU 102 to the gNB are illustrated. In FIG. 10, measResolution1 represents a parameter value (e.g., equal to mgrp) where the WTRU 102 collects and reports all possible measurement data points that it measures. This option for data collection may unduly burden the air interface and may cause delays in the uplink when reporting this information to a gNB, such as when a high number of data points are requested.

For example, to reduce the amount of transmitted data, using measResolution2 or measResolution3 parameter values can tune down the number of requested data points. In both of these options, there is an assumption that the particular measResolution value is chosen such that each data point is an averaged value that matches with a suitable nrofSS-BlocksToAverage parameter. In the example of measResolution2, a measResolution2 parameter value corresponding to 12 data points before reportTime and a nrofSS-BlocksToAverage parameter value corresponds to 3. Hence, each of the 12 points are averages of the last 3 samples. In the example of measResolution3, a measResolution3 parameter value is configured which may lead to RLF reporting of a corresponding 6 (e.g., averaged) data points. With the measResolution4 and measResolution5 parameter values, each of measResolution4 and measResolution5 may be associated with a nrofSS-BlocksToAverage parameter value. In FIG. 10, measResolution4 has a parameter value corresponding to 12 data points and measResolution5 has a parameter value corresponding to 5 data points. With respect to measResolution4 and measResolution5, the corresponding nrofSS-BlocksToAverage may take any value, such as one different than measResolution1, measResolution2 or measResolution3. This provides a mechanism for the gNB to control both the amount of transmitted data, at the same time that it controls the averaging of the measurements.

For example, in FIG. 10, nrofSS-BlocksToAverage=2 may be configured for measResolution4 and nrofSS-BlocksToAverage=4 for measResolution5. As can be seen in FIG. 10, the gNB may configure the WTRU 102 to apply different filtering parameters to a (e.g., same) measurement resolution and may advantageously control the smoothness of the reported measurement information. For example, measurements corresponding to measResolution4 may be an average of a first number (e.g., 2) measurement data points whereas measurements corresponding to measResolution5 may be an average of a second, larger number (e.g., 4) measurement data points.

Measurement Data Control

In certain representative embodiments, the rationale for controlling the amount of transmitted data (e.g., measurement data points) relates to the high load that may be introduced in the uplink direction. As an example, this may allow a gNB and/or the WTRU 102 to differentiate the amount of data it requests from the WTRU 102 for successful and failed HO cases. For example, the successful cases may require less data because they would require rougher optimization, as opposed to failure cases, where finer optimization is needed. As another example, this may allow for the gNB and/or the WTRU 102 to deploy strategies that reduce the amount of collected data over time, such as when as the number of failure cases decreases.

In certain representative embodiments, the rationale for controlling the averaging of the measurements for the different cases relates to the stability of the radio conditions. Over time, and with the enhancements proposed herein, a gNB may learn about the stability or instability of the air interface quantities for different WTRUs and/or different geographical areas. This is in any case true but more so if the WTRU 102 is performing beam level measurements, such as those that provide a finer location indication. In locations where radio conditions are stable, the gNB and/or WTRU may decide on higher nrofSS-BlocksToAverage values. This may result in fewer data points being reported. In locations where the radio conditions are unstable, the gNB and/or WTRU may decide on lower nrofSS-BlocksToAverage values. This may result in increasing the amount of reported data, but may also provide the RAN with better knowledge of its radio coverage conditions. For example, the enhancements proposed herein may allow for a reduction in the data that needs to be collected and/or reported over time, as the RAN learns about the radio coverage conditions it provides to WTRUs.

In certain representative embodiments, the RLF offset, SHO offset, measResolution, nrofSS-BlocksToAverage, and/or nrofCSI-RS-ResourcesToAverage parameters may be applied (e.g., at a WTRU) to enhance the reporting capabilities with respect to any of the cases shown in FIGS. 6 to 9 (e.g., timestamps thereof).

Signaling of Parameters to the WTRU

In certain representative embodiments, one or more of the additional parameters may be included in one or more RRCReconfiguration messages. For example, the additional parameters may be signaled in a RRCReconfiguration message which signals the "conditional reconfiguration" configuration to the WTRU 102. For example, RRC signaling of an indication of any of the parameters may allow for UE specific configuration of reporting behavior which is tuned (e.g., dynamically configured) by the network.

In certain representative embodiments, one or more of the additional parameters may be included as part of the network information which may be required for a UE to operate under a certain gNB. For example, the additional parameters may be broadcast over any of the System Information Blocks (SIB) that the gNB periodically transmits for all UEs. For example, broadcasting using SIBs may allow for the network to configure the same reporting behavior for all UEs.

In certain representative embodiments, one or more of the additional parameters may be predefined values.

In certain other representative embodiments, the additional parameters may be segregated and transmitted by any of RRC signaling, broadcasting of network information, and/or may be predefined system parameters.

RRC Reconfiguration Procedure for Successful Conditional Reconfiguration

Figure 11:
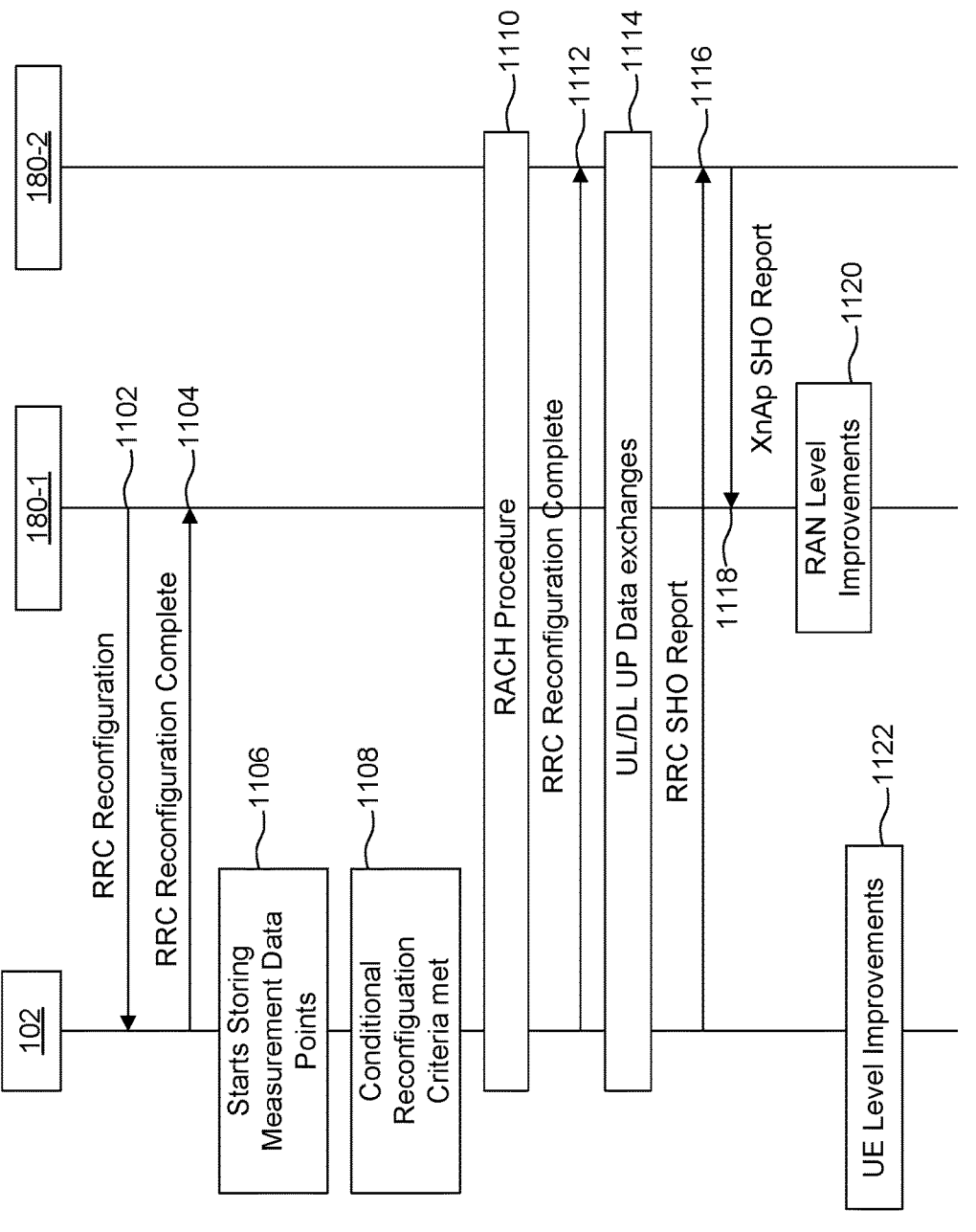
FIG. 11 is a signaling diagram illustrating a representative procedure for configuring enhanced conditional reconfiguration parameters.

FIG. 11 is a signaling diagram illustrating a representative procedure for configuring enhanced conditional reconfiguration parameters. In FIG. 11, one or more of the additional parameters are acquired by (e.g., configured at) the WTRU 102 by transport from the gNB via RRCReconfiguration messages.

In FIG. 11, the WTRU 102 may be in RRC Connected mode with the source gNB 180-1. For example, the WTRU 102 operation in RRC Connected mode may include any of monitoring short messages transmitted with a paging radio network temporary identifier (P-RNTI), monitoring a control channel associated with a shared data channel to determine if data is scheduled for the WTRU 102, providing channel quality and feedback information, performing neighboring cell measurements and measurement reporting, and acquiring of system information. At 1102 in FIG. 11, the WTRU 102 may receive at least one RRCReconfiguration message. The RRCReconfiguration message is used by the gNB 180-1 to configure a conditional reconfiguration on the WTRU 102. In addition, the message may additionally (e.g., optionally) configure a measurement configuration on the WTRU 102. For example, a RRCReconfiguration message may include information indicating any of the parameters RLF offset, SHO offset, measResolution, nrofSS-Blocks-ToAverage-SHO, nrofCSI-RS-ResourcesToAverage-SHO, nrofSS-BlocksToAverage-RLF and/or nrofCSI-RS-ResourcesToAverage-RLF. As other examples, any of the foregoing parameters may by communicated by broadcast information and/or set as system parameters. For example, RLF offset, SHO offset and/or measResolution may be indicated as any of a number (e.g., integer value) of seconds (e.g., milliseconds), slots, mini-slots, and/or symbols.

In certain representative embodiments, the measResolution parameter may be further divided in measResolution-SHO and measResolutionRLF. For example, the gNB may provide respective measResolutionSHO and measResolutionRLF parameters in order to differentiate the number of data points to be reported by the WTRU 102 to the gNB for distinguishing between successful and failed HO cases. For example, the measResolutionSHO and/or measResolution- RLF parameters may be sent as a tuple, where a cell ID and/or beam ID are also included. As an example, a RRC message may include parameters of any of cellID, beam ID, measResolutionSHO, measResolutionRLF, RLF offset, SHO offset, nrofSS-BlocksToAverage-SHO, nrofCSI-RS-ResourcesToAverage-SHO, nrofSS-BlocksToAverage-RLF, and/or nrofCSI-RS-ResourcesToAverage-RLF. The gNB may configure the WTRU 102 with cell and/or beam specific measurement reporting configurations for any cell which the gNB wants to receive more measurements from by the WTRU 102. The cell and/or beam IDs may be a part of the IE ReportConfigNR. As another example, the gNB may also send this information as a list of cells and/or beams which are associated with the remaining parameters. In this case, the indicated cells and/or beams would have the same measurement reporting configuration.

In certain representative embodiments, the WTRU 102 may perform measurement and reporting using the meas-ResolutionSHO and/or measResolutionRLF parameters for cells, beams and/or other signals different than those configured by the gNB or in addition to those cells and/or beams configured by the gNB. For example, the WTRU 102 may receive a list of cells to measure (e.g., in a RRC message). The WTRU 102 may be configured to use the (e.g., configured) additional parameters for measurements and reporting as described herein with respect to any of other cells different from those in the list of cells, sidelinks, WiFi links and/or Bluetooth links.

In certain representative embodiments, the gNB may configure the WTRU 102 to measure and report on any cell, beam and/or sidelink that is not indicated by the IE Report-ConfigNR. For example, the parameters max_outsider_cells, max_outsider_beams, max_outsider_SL may also be transmitted to the WTRU 102 (e.g., indicated in RRC messaging or in broadcast information).

At 1104, the WTRU 102 may send an acknowledgement of the conditional reconfiguration to the gNB (e.g., by sending it an RRC Reconfiguration complete message). At 1106, the WTRU 102 may determine the RLF offset window and/or SHO offset window start times based on the RLF and SHO offset parameters as described herein. The WTRU 102 may start measuring the configured quantities based on the configured measurement data points. For example, the WTRU 102 may continue to average measurement data points as configured in the previous messages (e.g., for the purpose of measurement reporting). For example, the WTRU 102 may respectively modify the frequency of the measurement data points based on the measResolution parameter. For example, the WTRU 102 may collect averaged measurement data points based on the measResolution parameter and any of nrofSS-BlocksToAverage-SHO, nrofCSI-RS-ResourcesToAverage-SHO, nrofSS-Blocks-ToAverage-RLF and/or nrofCSI-RS-ResourcesToAverage-RLF (e.g., if configured). At this time, the WTRU 102 may not know whether the conditional reconfiguration will fail or succeed, so the data storage process may starts at start at any of the SHO window and/or the RLF window (e.g., the earliest point possible).

At 1108, the WTRU 102 may determine that the conditional reconfiguration criteria has been satisfied. The WTRU 102 may proceed at 1110 to perform a RACH procedure at a target gNB 180-2. For example, the WTRU 102 may perform this step directly because it may have previously received all the necessary handover configuration (e.g., in the RRCReconfiguration message at 1102). After the RACH procedure completes, the WTRU 102 may send a completion message (e.g., an RRCReconfigurationComplete message) which indicates to the target gNB 180-2 that the RRC reconfiguration is complete at 1112. After the RRC reconfiguration is completed, UL/DL of UP data may start at the target gNB 180-2 at 1114.

In certain representative embodiments, the WTRU 102 may evaluate its timer configurations and may conclude the conditional reconfiguration was successfully completed. At 1116, the WTRU 102 may send a RRC SHO report to the target gNB 180-2 (e.g., the gNB currently serving the WTRU 102). The RRC SHO report may include the measurement data points and/or filtered data which was configured for the SHO offset window. For example, on condition that measResolution has a same value as mgrp (e.g., meas-Resolution1 in FIG. 5), the measurement data points may be sent without filtering and/or averaging. As another example, on condition that measResolution has a different value than mgrp, the measurement data points may be filtered and/or averaged (e.g., according to a corresponding one of the nrofSS-BlocksToAverage-SHO and/or nrofCSI-RS-Re-sourcesToAverage-SHO parameters).

In FIG. 11, the source gNB 180-1 was the gNB that configured the WTRU 102 with conditional reconfiguration (e.g., at 1102). The source gNB 180-1 may need to evaluate the conditional reconfiguration configuration. For example, the target gNB 180-2 may use the Xn interface at 1118 to transmit the SHO report received at 1116 to the source gNB 180-1. The (e.g., source) gNB now has the conditional reconfiguration measurement data points (e.g., from the SHO report at 9.) and may proceed at 1120 to perform any heuristic, artificial intelligence, and/or machine learning analysis methods to improve on the conditional reconfiguration criteria, DAPS trigger, measurement reporting criteria and/or the measurement reporting parameters (e.g., meas-Resolution, nrofSS-BlocksToAverageSHO, etc.) described herein. At 1122, the WTRU 102 may perform any heuristic, artificial intelligence, and/or machine learning analysis methods to refine the measurement reporting parameters (e.g., measResolution, nrofSS-BlocksToAverageSHO, etc.). For example, refined and/or updated measurement reporting parameters may be sent (e.g., as RRC messaging and/or broadcast information) to another WTRU after 1120 in FIG. 11.

In certain representative embodiments, the WTRU 102 may send other measurement reports (e.g., other than a SHO/RLF report) during a time period between 1102 and 1106 in FIG. 11 The number and periodicity (if any) of those reports may be configurable. Such reporting is omitted from FIG. 11 for purposes of explanation as they may be optional.

RRC Reconfiguration Procedure for a Failed Conditional Reconfiguration

In certain representative embodiments, the WTRU 102 may conclude the conditional reconfiguration has failed. At 8., the WTRU 102 may send a RLF report to a gNB (e.g., the gNB to which the WTRU 102 has re-established a RRC connection). The RLF report may include the measurement data points and/or filtered data which was configured for the RLF offset window. For example, on condition that meas-Resolution has a same value as mgrp (e.g., measResolution1 in FIG. 5), the measurement data points may be sent without filtering and/or averaging. As another example, on condition that measResolution has a different value than mgrp, the measurement data points may be filtered and/or averaged (e.g., according to a corresponding one of the nrofSS-BlocksToAverage-RLF and/or nrofCSI-RS-ResourcesToAv-erage-RLF parameters).

FIGS. 6 to 9 illustrate various failure cases. Upon the occurrence of a failure, the WTRU 102 will at some point in time reconnect to a gNB and send an RLF report to the gNB. For example, the RLF report may include information indicating timestamps for the failure (e.g., the failure leading to the RLF report). The RLF report may also include the configured measurement data points and/or filtered measurements which were configured for the RLF Offset window. Additional Cell Measurement Reporting In certain representative embodiments, the measured values reported (e.g., in a SHO or RLF report) may include measurements of any of the source cell, the target cell, other cells that were CHO candidates, other neighbor cells and/or any other measurements made by the WTRU 102 in a same timeframe as the events above (e.g., within the RLF Offset window and/or the SHO Offset window). This additional measurement reporting may be configured by the network. For example, the additional measurement reporting may be limited to a configured number of cells and/or limited by other criteria (e.g., a number of neighbor cells that had higher measured values than the target cell but were not CHO or DAPS candidate cells), such as to avoid a flood of information in the uplink direction.

Layer 3 Filtering

As the WTRU 102 measures the air interface, whether it is measuring cell, beam or sidelink, and whether it is measuring RSRP, RSRQ, SINR, RSCP or EcN0 quantities, it uses the following formula to average the received measurement data points from the physical layer for evaluation of conditional reconfiguration criteria or for measurement report triggering:

$$F_n = (1 - a) * F_{n-1} + a * M_n$$

where $M_n$ is the latest received measurement result from the physical layer;

$F_n$ is the updated filtered measurement result, that is used for evaluation of reporting criteria or for measurement reporting; and $F_{n-1}$ is the old filtered measurement result, where $F_0$ is set to $M_1$ when the first measurement result from the physical layer is received; and forMeasObjectNR, $a = \frac{1}{2}^{(ki/4)}$, where $k_i$ is thefilterCoefficient for the corresponding measurement quantity of the i:th Quantity-ConfigNR in quantityConfigNR-List, and i is indicated by quantityConfigIndex in MeasObjectNR; for other measurements, $a = \frac{1}{2}^{(k/4)}$, where k is the filterCoefficient for the corresponding measurement quantity received by the quantityConfig; for UTRA-FDD, $a = \frac{1}{2}^{(k/4)}$ where k is the filterCoefficient for the corresponding measurement quantity received by quantityConfigUTRA-FDD in the QuantityConfig.

In this formula, $M_n$ corresponds to a measurement data point that is plugged into the formula influenced by weight parameter a. For example, this is done to avoid situations where a spike in the value of the latest measurement would significantly change the value of $F_n$.

$F_n$ represents therefore the average measurement value for any of the measured quantities (RSRP, RSRQ, SINR, RSCP or EcN0) that is evaluated for the purpose of triggering a measurement report to the gNB or to validate that the conditional reconfiguration configurations are met. Parameters nrofSS-BlocksToAverageSHO and nrofCSI-RS-Re-sourcesToAverageSHO (or similar RLF parameters) therefore define the number of samples ($F_2$, $F_3$, $F_4$, $F_5$, . . . , $F_{max}$) the WTRU 102 averages before evaluating/validating measurement report and conditional reconfiguration triggers.

FIG. 12 is a flow diagram illustrating a representative procedure for enhanced HO measurement reporting by a WTRU 102. As shown in FIG. 12, a WTRU 102 may receive (e.g., from a first base station) information indicating one or more reconfiguration conditions associated with a handover (HO) at 1202. The WTRU 102 may receive (e.g., from the first base station) information indicating a measurement configuration associated with the HO at 1204. For example, the measurement configuration may include (1) a measurement resolution and/or (2) a time offset. For example, the information received at 1202 and 1204 may be received separately or in a same transmission (e.g., via RRC). At 1206, the WTRU may perform a plurality of measurements of one or more reference signals (RSs). At 1208, on condition that the one or more reconfiguration conditions are satisfied, the WTRU may send a successful HO report (e.g., to a second base station) or a radio link failure (RLF) report (e.g., to the first base station) associated with the HO. For example, the successful HO report or the RLF report may include information associated with the plurality of measurements which are performed in a first time interval using the measurement resolution. The first time interval may (e.g., be determined to) begin at a time the one or more reconfiguration conditions are satisfied minus the time offset and end prior to the sending of the successful HO report or the RLF report.

For example, in the case of a successful HO, the first time interval may correspond to the SHO offset window in FIG. 10 where the time offset may be a SHO offset value.

For example, in the case of a RLF, the first time interval may correspond to the RLF offset window in FIG. 10 where the time offset may be a RLF offset value.

For example, the WTRU 102 may, on condition that the one or more reconfiguration conditions are satisfied, initiate the HO. After the HO, sending (e.g., at a reporting time) the successful HO report (e.g., where the HO was successfully completed) or the RLF report (e.g., where the HO failed to complete successfully).

For example, the WTRU 102 may determine whether the one or more reconfiguration conditions are satisfied (e.g., prior to initiating the HO). For example, the determining of whether the one or more reconfiguration conditions are satisfied may be based on the plurality of measurements (e.g., during a second time interval, such as between the reception at 1202 and/or 1204 and the initiation of the HO).

For example, the WTRU 102 may send the successful HO report on condition that the HO is successful (e.g., is successfully completed).

For example, the WTRU 102 may send the RLF report on condition that the HO failed (e.g., failed to successfully complete).

For example, the HO may be a conditional HO or a dual active protocol stack (DAPS) HO.

For example, the measurement resolution may be a measurement granularity or a periodicity (e.g., in the time domain) associated with the plurality of measurements which are performed in the first time interval.

For example, the time offset may be a first value on condition that the HO is successful. For example, the time offset may be a second value (e.g., larger than the first value) on condition that the HO failed.

For example, the measurement configuration may further include (3) a number of the RSs (e.g., RS measurements) to average. For example, the successful HO report or the RLF report may include information associated with averaging the plurality of measurements which are performed in the first time interval using the number of the RSs to average.

For example, the successful HO report or the RLF report may include information associated with the plurality of measurements which are performed in the first time interval and which are filtered.

For example, the one or more RSs (e.g., measured at 1206) may be synchronization signal blocks (SSBs) or channel state information RSs (CSI-RSs).

FIG. 13 is a flow diagram illustrating another representative procedure for enhanced conditional HO measurement reporting by a WTRU 102. A WTRU 102 may receive information indicating one or more reconfiguration conditions associated with a handover (HO) at 1302. The WTRU 102 may receive information indicating a measurement configuration associated with the HO at 1304. For example, the measurement configuration may include (1) a measurement resolution and/or (2) a time offset. For example, the information received at 1302 and 1304 may be received separately or in a same transmission (e.g., via RRC). At 1306, the WTRU 102 may perform a plurality of measurements of one or more reference signals (RSs). At 1308, the WTRU 102 may, on condition that the one or more reconfiguration conditions are satisfied, initiate the HO. After initiating the HO, the WTRU 102 may send a report associated with the HO at 1310. For example, the report may include information associated with (1) the plurality of measurements which are performed in a first time interval using the measurement resolution, and (2) a timestamp of an event associated with the HO. The first time interval may (e.g., be determined to) begin at a time the one or more reconfiguration conditions are satisfied minus the time offset and end prior to the sending of the successful HO report or the RLF report.

For example, in the case of a successful HO, the first time interval may correspond to the SHO offset window in FIG. 10 where the time offset may be a SHO offset value.

For example, in the case of a RLF, the first time interval may correspond to the RLF offset window in FIG. 10 where the time offset may be a RLF offset value.

For example, on condition the HO is successful, the report may include information indicating that the HO was successful. As an example, the event may be a completion of the HO.

For example, on condition the HO has failed, the report may include information indicating that the HO has failed. As an example, the event may include any of a radio link failure (RLF), a HO recovery, and/or a connection reestablishment.

For example, the WTRU 102 may determine whether the one or more reconfiguration conditions are satisfied prior to an expiry time (e.g., to initiate the HO).

For example, the WTRU 102 may determine whether the one or more reconfiguration conditions are satisfied based on the plurality of measurements (e.g., during a second time interval). The second time interval may begin at a time the information indicating the one or more reconfiguration conditions is received.

For example, a successful HO report may be sent by the WTRU 102 on condition that the HO is successful.

For example, the RLF report may be sent by the WTRU 102 on condition that the HO failed.

For example, the HO may be a conditional HO or a dual active protocol stack (DAPS) HO.

For example, the measurement resolution may be a measurement granularity or periodicity (e.g., in the time domain) of the plurality of measurements which are performed in the first time interval.

For example, the measurement resolution may be a measurement granularity or a periodicity (e.g., in the time domain) associated with the plurality of measurements which are performed in the first time interval.

For example, the time offset may be a first value on condition that the HO is successful. For example, the time offset may be a second value (e.g., larger than the first value) on condition that the HO failed.

For example, the measurement configuration may further include (3) a number of the RSs (e.g., RS measurements) to average. For example, the successful HO report or the RLF report may include information associated with averaging the plurality of measurements which are performed in the first time interval using the number of the RSs to average.

For example, the successful HO report or the RLF report may include information associated with the plurality of measurements which are performed in the first time interval and which are filtered.

For example, the one or more RSs (e.g., measured at 1306) may be synchronization signal blocks (SSBs) or channel state information RSs (CSI-RSs).

FIG. 14 is a flow diagram illustrating a representative procedure for receiving enhanced HO measurement reporting by a first base station (e.g., gNB 180). At 1402, the first base station may send, to a WTRU 102, information indicating a measurement configuration. For example, the measurement configuration may include (1) a measurement resolution and/or (2) a time offset. At 1404, the first base station may send, to the WTRU 102, information indicating a handover (HO) to a second base station. For example, the information sent at 1402 and 1404 may be sent separately or in a same transmission (e.g., via RRC). At 1406, the first base station may receive a report associated with the HO. For example, the report may include information associated with (1) a plurality of measurements which are performed (e.g., by the WTRU 102) in a first time interval using the measurement resolution, and (2) a timestamp of an event associated with the HO. The first time interval may (e.g., be determined to) begin at a time the information indicating the HO is received (e.g., at 1404) minus the time offset and end prior to the sending of the successful HO report or the RLF report.

For example, in the case of a successful HO, the first time interval may correspond to the SHO offset window in FIG. 10 where the time offset may be a SHO offset value.

For example, in the case of a RLF, the first time interval may correspond to the RLF offset window in FIG. 10 where the time offset may be a RLF offset value.

For example, the report may be received from the second base station on condition the HO is successful. As an example, the event may be a completion of the HO.

For example, the report may be received from the WTRU 102 on condition the HO has failed. As an example, the event may include any of a radio link failure (RLF), a HO recovery, and/or a connection reestablishment.

For example, the base station may configure the WTRU 102 with one or more reconfiguration conditions (e.g., to initiate the HO) at 1404. For example, the WTRU 102 may determine whether the one or more reconfiguration conditions are satisfied based on the plurality of measurements (e.g., during a second time interval). The second time interval may begin at a time the information indicating the one or more reconfiguration conditions is received.

For example, a successful HO report may be received from the second base station on condition that the HO is successful.

For example, the RLF report may be received from the WTRU 102 on condition that the HO failed.

For example, the HO may be a conditional HO or a dual active protocol stack (DAPS) HO.

For example, the HO may be a legacy HO. The information indicating the HO at 1404 may trigger the WTRU 102 to initiate the HO.

For example, the measurement resolution may be a measurement granularity or periodicity (e.g., in the time domain) of the plurality of measurements which are performed in the first time interval.

For example, the measurement resolution may be a measurement granularity or a periodicity (e.g., in the time domain) associated with the plurality of measurements which are performed in the first time interval.

For example, the time offset may be a first value on condition that the HO is successful. For example, the time offset may be a second value (e.g., larger than the first value) on condition that the HO failed.

For example, the measurement configuration may further include (3) a number of the RSs (e.g., RS measurements) to average. For example, the successful HO report or the RLF report may include information associated with averaging the plurality of measurements which are performed (e.g., by the WTRU 102) in the first time interval using the number of the RSs to average.

For example, the successful HO report or the RLF report may include information associated with the plurality of measurements which are performed in the first time interval and which are filtered.

For example, the one or more RSs (e.g., transmitted by the first base station) may be synchronization signal blocks (SSBs) or channel state information RSs (CSI-RSs).

FIG. 15 is a flow diagram illustrating another representative procedure for receiving enhanced HO measurement reporting by a first base station (e.g., gNB 180). At 1502, the first base station may send, to a WTRU 102, information indicating one or more reconfiguration conditions associated with a handover (HO) (e.g., to a second base station). At 1504, the first base station may send, to the WTRU 102, information indicating a measurement configuration. For example, the measurement configuration may include (1) a measurement resolution and/or (2) a time offset. At 1506, the first base station may receive a report associated with the HO. For example, the report may include information associated with (1) the plurality of measurements which are performed in a first time interval, beginning at a time the HO is initiated minus the time offset and prior to the sending of the report, using the measurement resolution, and (2) a timestamp of an event associated with the HO.

For example, the report may be received from the second base station on condition the HO is successful. As an example, the event is a completion of the HO.

For example, the report may be received from the WTRU 102 on condition the HO has failed. As an example, the event may include any of a radio link failure (RLF), a HO recovery, and/or a connection reestablishment.

For example, on condition the HO is successful, the report may include information indicating that the HO was successful. As an example, the event may be a completion of the HO.

For example, on condition the HO has failed, the report may include information indicating that the HO has failed. As an example, the event may include any of a RLF, a HO recovery, and/or a connection reestablishment.

For example, in the case of a successful HO, the first time interval may correspond to the SHO offset window in FIG. 10 where the time offset may be a SHO offset value.

For example, in the case of a RLF, the first time interval may correspond to the RLF offset window in FIG. 10 where the time offset may be a RLF offset value.

For example, the WTRU 102 may determine whether the one or more reconfiguration conditions are satisfied based on the plurality of measurements (e.g., during a second time interval). The second time interval may begin at a time the information indicating the one or more reconfiguration conditions is received (e.g., at 1502).

For example, the HO may be a conditional HO or a dual active protocol stack (DAPS) HO.

For example, the measurement resolution may be a measurement granularity or periodicity (e.g., in the time domain) of the plurality of measurements which are performed in the first time interval.

For example, the measurement resolution may be a measurement granularity or a periodicity (e.g., in the time domain) associated with the plurality of measurements which are performed in the first time interval.

For example, the time offset may be a first value on condition that the HO is successful. For example, the time offset may be a second value (e.g., larger than the first value) on condition that the HO failed.

For example, the measurement configuration may further include (3) a number of the RSs (e.g., RS measurements) to average. For example, the successful HO report or the RLF report may include information associated with averaging the plurality of measurements which are performed in the first time interval using the number of the RSs to average.

For example, the successful HO report or the RLF report may include information associated with the plurality of measurements which are performed in the first time interval and which are filtered.

For example, the one or more RSs may be synchronization signal blocks (SSBs) or channel state information RSs (CSI-RSs).

FIG. 16 is a flow diagram illustrating a representative procedure for enhanced HO measurement reporting by a WTRU 102. At 1602, a WTRU 102 may receive information indicating a measurement configuration. For example, the measurement configuration may include (1) a measurement resolution and/or (2) a time offset. At 1604, the WTRU 102 may receive information indicating a handover (HO). For example, at 1604, the information indicating the HO may trigger the WTRU 102 to perform the HO (e.g., to another base station). For example, at 1604, the information indicating the HO may include one or more reconfiguration conditions for triggering the HO. In some embodiments, the information received at 1602 and 1604 may be received in a same transmission (e.g., via an RRC message). At 1606, the WTRU 102 may perform a plurality of measurements of one or more reference signals (RSs). At 1608, the WTRU may send a report associated with the HO. For example, the report may include information associated with the plurality of measurements which are performed in a first time interval using the measurement resolution. The first time interval may begin at a time the HO is initiated minus the time offset and may end prior to the sending of the report at 1608.

For example, in the case of a successful HO, the first time interval may correspond to the SHO offset window in FIG. 10 where the time offset may be a SHO offset value.

For example, in the case of a RLF, the first time interval may correspond to the RLF offset window in FIG. 10 where the time offset may be a RLF offset value.

For example, the WTRU 102 may, on condition that one or more reconfiguration conditions are satisfied, initiate the HO. After the HO is performed, the WTRU 102 may send (e.g., at a reporting time) the report to a second base station (e.g., where the HO was successfully completed) or to the first base station (e.g., such as where the HO failed to complete successfully).

For example, the WTRU 102 may determine whether one or more reconfiguration conditions are satisfied (e.g., prior to initiating the HO). For example, the determining of whether the one or more reconfiguration conditions are satisfied may be based on the plurality of measurements.

For example, the WTRU 102 may send a successful HO report at 1608 on condition that the HO is successful (e.g., is successfully completed).

For example, the WTRU 102 may send a RLF report at 1608 on condition that the HO failed (e.g., failed to successfully complete).

For example, the HO may be a conditional HO or a dual active protocol stack (DAPS) HO.

For example, the HO may be a legacy HO.

For example, the measurement resolution may be a measurement granularity or a periodicity (e.g., in the time domain) associated with the plurality of measurements which are performed in the first time interval.

For example, the time offset may be a first value on condition that the HO is successful. For example, the time offset may be a second value (e.g., larger than the first value) on condition that the HO failed.

For example, the measurement configuration may further include (3) a number of the RSs (e.g., RS measurements) to average. For example, the report may include information associated with averaging the plurality of measurements which are performed in the first time interval using the number of the RSs to average.

For example, the report may include information associated with the plurality of measurements which are performed in the first time interval and which are filtered.

For example, the one or more RSs (e.g., measured at 1608) may be synchronization signal blocks (SSBs) or channel state information RSs (CSI-RSs).

In certain representative embodiments, a method may be implemented by a wireless WTRU. The method may include receiving, from a first base station, information for a conditional reconfiguration. For example, the information for the conditional reconfiguration may include measurement information for at least one measurement report quantity. The WTRU may proceed to perform one or more measurements of the at least one measurement report quantity. The WTRU may determine whether the conditional reconfiguration is triggered. On condition the conditional reconfiguration is triggered, the WTRU may perform a random access procedure with a second base station. After the random access procedure, the WTRU may send a conditional reconfiguration report to the first base station and/or the second base station. For example, the conditional reconfiguration report may include information associated with the one or more measurements of the at least one measurement report quantity.

For example, the WTRU may determine a start time of the performing one or more measurements of the at least one measurement report quantity based on the information for the conditional reconfiguration.

For example, the information for the conditional reconfiguration may include information indicating an expiration time of the information for the conditional reconfiguration, and the measurement information may include information indicating an offset time. The determination of the start time may be based on a difference between the expiration time and the offset time.

For example, the measurement information may include at least one measurement resolution for the at least one measurement report quantity. The one or more measurements of the at least one measurement report quantity may be separated in time (e.g., performed periodically or at time intervals) based on the at least one measurement resolution.

For example, the measurement information includes information indicating at least one amount of resources to average for the at least one measurement report quantity. The conditional reconfiguration report may include information associated with averaged values of the one or more measurements of the at least one measurement report quantity based on the at least one amount of resources to average. For example, the amount of resources to average may include a number of synchronization signal blocks and/or a number of reference signals.

For example, the measurement information may include any of (1) information indicating one or more cells of the first and/or second base station and/or (2) information indicating one or more beams of the first and/or second base station. The WTRU may perform the one or more measurements (e.g., of the at least one measurement report quantity) for the one or more cells and/or using the one or more beams.

For example, the conditional reconfiguration may be (1) a conditional handover (CHO) from the first base station to the second base station, or (2) a dual active protocol stack (DAPS) handover (HO) from the first base station to the second base station. The conditional reconfiguration report may include (1) information indicating that the conditional reconfiguration was successful, and (2) the information of the one or more measurements of the at least one measurement report quantity. The conditional reconfiguration report may include (1) information indicating that a radio link failure (RLF) occurred after triggering the conditional reconfiguration, and (2) the information of the one or more measurements of the at least one measurement report quantity.

CONCLUSION

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices that include processors are noted. These devices may include at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples include one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components included within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality.

Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may include usage of the introductory phrases "at least one" and "one or more" to introduce claim recitations. However, the use of such phrases should not be construed to imply that the introduction of a claim recitation by the indefinite articles "a" or "an" limits any particular claim including such introduced claim recitation to embodiments including only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

What is claimed is:

1. A method implemented by a wireless transmit/receive unit (WTRU), the method comprising:
    receiving information indicating one or more reconfiguration conditions associated with a handover (HO);
    receiving information indicating a measurement configuration associated with the HO, the measurement configuration including (1) a measurement resolution and (2) a time offset;
    performing a plurality of measurements of one or more reference signals (RSs); and
    sending a report associated with the HO based on the one or more reconfiguration conditions being satisfied,
    wherein the report includes information associated with the plurality of measurements which are performed in a first time interval, beginning at a time the one or more reconfiguration conditions are satisfied minus the time offset and ending prior to the sending of the report, using the measurement resolution.

2. The method of claim 1, further comprising:
    initiating the HO based on the one or more reconfiguration conditions being satisfied,
    wherein, after completion of the HO, the report includes information indicating the HO was successful.

3. The method of claim 1, further comprising:
    initiating the HO based on the one or more reconfiguration conditions being satisfied; and determining the HO has failed, wherein the report includes information indicating the HO has failed.

4. The method of claim 1, further comprising:

determining whether the one or more reconfiguration conditions are satisfied based on the plurality of measurements which are performed in a second time interval different from the first time interval.

5. The method of claim 1, wherein the HO is a conditional HO or a dual active protocol stack (DAPS) HO.

6. The method of claim 1, wherein the measurement resolution is a measurement granularity or periodicity of the plurality of measurements which are performed in the first time interval.

7. The method of any of claim 1, wherein the time offset is a first value associated with completion of the HO or the time offset is a second value, larger than the first value, associated with failure of the HO.

8. The method of claim 1, wherein the report includes information associated with the plurality of measurements which are performed in the first time interval and which are averaged and/or filtered.

9. The method of claim 1, wherein the one or more RSs are synchronization signal blocks (SSBs) or channel state information RSs (CSI-RSs).

10. A wireless transmit/receive unit (WTRU) comprising:

a processor and a transceiver which are configured to:

receive information indicating one or more reconfiguration conditions associated with a handover (HO);

receive information indicating a measurement configuration associated with the HO, the measurement configuration including (1) a measurement resolution and (2) a time offset;

perform a plurality of measurements of one or more reference signals (RSs); and send a report associated with the HO based on the one or more reconfiguration conditions being satisfied, wherein the report includes information associated with the plurality of measurements which are performed in a first time interval, beginning at a time the one or more reconfiguration conditions are satisfied minus the time offset and prior to the sending of the report, using the measurement resolution.

11. The WTRU of claim 10, wherein the processor and the transceiver are configured to:

initiate the HO based on the one or more reconfiguration conditions being satisfied, and wherein, after completion of the HO, the report includes information indicating the HO was successful.

12. The WTRU of claim 10, wherein the processor and the transceiver are configured to:

initiate the HO based on the one or more reconfiguration conditions being satisfied, and determine the HO has failed, wherein the report includes information indicating the HO has failed.

13. The WTRU of claim 10, wherein the wherein the processor and the transceiver are configured to determine whether the one or more reconfiguration conditions are satisfied based on the plurality of measurements which are performed during a second time interval different from the first time interval.

14. The WTRU of any of claim 10, wherein the HO is a conditional HO or a dual active protocol stack (DAPS) HO.

15. The WTRU of claim 10, wherein the measurement resolution is a measurement granularity or periodicity of the plurality of measurements which are performed in the first time interval.

16. The WTRU of any of claim 10, wherein the time offset is a first value associated with completion of the HO or the time offset is a second value, larger than the first value, associated with failure of the HO.

17. The WTRU of claim 10, wherein the report includes information associated with the plurality of measurements which are performed in the first time interval and which are averaged and/or filtered.

18. The WTRU of any of claim 10, wherein the one or more RSs are synchronization signal blocks (SSBs) or channel state information RSs (CSI-RSs).

\* \* \* \* \*